United States Patent
Miyamoto et al.

(10) Patent No.: US 8,427,905 B2
(45) Date of Patent: Apr. 23, 2013

(54) OPTIMUM PSEUDO RANDOM SEQUENCE DETERMINING METHOD, POSITION DETECTION SYSTEM, POSITION DETECTION METHOD, TRANSMISSION DEVICE AND RECEPTION DEVICE

(75) Inventors: Junichi Miyamoto, Tokyo (JP); Hiroshi Kajitani, Tokyo (JP)

(73) Assignee: NEC Corporation, Tokyo (JP)

( * ) Notice: Subject to any disclaimer, the term of this patent is extended or adjusted under 35 U.S.C. 154(b) by 435 days.

(21) Appl. No.: 12/674,216

(22) PCT Filed: Aug. 29, 2008

(86) PCT No.: PCT/JP2008/065573
§ 371 (c)(1),
(2), (4) Date: Feb. 19, 2010

(87) PCT Pub. No.: WO2009/028680
PCT Pub. Date: Mar. 5, 2009

(65) Prior Publication Data
US 2011/0261654 A1 Oct. 27, 2011

(30) Foreign Application Priority Data

Aug. 30, 2007 (JP) ................ 2007-224858
Jul. 22, 2008 (JP) ................ 2008-188274

(51) Int. Cl.
*G01S 11/14* (2006.01)

(52) U.S. Cl.
USPC ............ 367/125; 367/124; 367/128; 367/907

(58) Field of Classification Search .................. 367/124, 367/125, 128, 907
See application file for complete search history.

(56) References Cited

U.S. PATENT DOCUMENTS

| 5,079,733 | A  | * | 1/1992 | Antoine et al. | ............... 708/252 |
| 6,118,205 | A  |   | 9/2000 | Wood et al. |  |
| 2008/0031093 | A1 | * | 2/2008 | Oura et al. | ................ 367/128 |

FOREIGN PATENT DOCUMENTS

JP 2001008262 A 1/2001
JP 2002139565 A 5/2002
(Continued)

OTHER PUBLICATIONS

International Search Report for PCT/JP2008/065573 mailed Sep. 22, 2008.

*Primary Examiner* — Ian Lobo

(57) ABSTRACT

To enable precise calculation of a propagation time of a direct wave which arrives fastest from an ultrasonic generation source without being affected by a reflected wave of an ultrasonic signal.

A plurality of ultrasonic signals generated based on a plurality of M sequences different from each other are propagated from a transmission side to a reception side, whereby the reception side generates model waveforms of the plurality of M sequences, executes correlation processing between each model waveform and a waveform of each ultrasonic signal and detects a secondary peak of a correlation value which appears when both waveforms partly coincide with each other to determine an M sequence which generates a smallest secondary peak among secondary peaks detected by all the correlation processing as an optimum M sequence. The transmission side sends out an electromagnetic signal and an ultrasonic signal modulated by an optimum M sequence generated based on an initial condition of the optimum M sequence to the reception side. The reception side calculates a correlation value between the ultrasonic signal and a model waveform of the ultrasonic modulated by the optimum M sequence, detects a first primary peak of the calculated correlation value and calculates an ultrasonic propagation time from a time point of the reception of the electromagnetic signal and a time point of the detection of the primary peak.

20 Claims, 13 Drawing Sheets

FOREIGN PATENT DOCUMENTS

| | | |
|---|---|---|
| JP | 2002286517 A | 10/2002 |
| JP | 2004108826 A | 4/2004 |
| JP | 3876370 B | 11/2006 |
| WO | 2005111653 A | 11/2005 |

* cited by examiner

FIG. 14
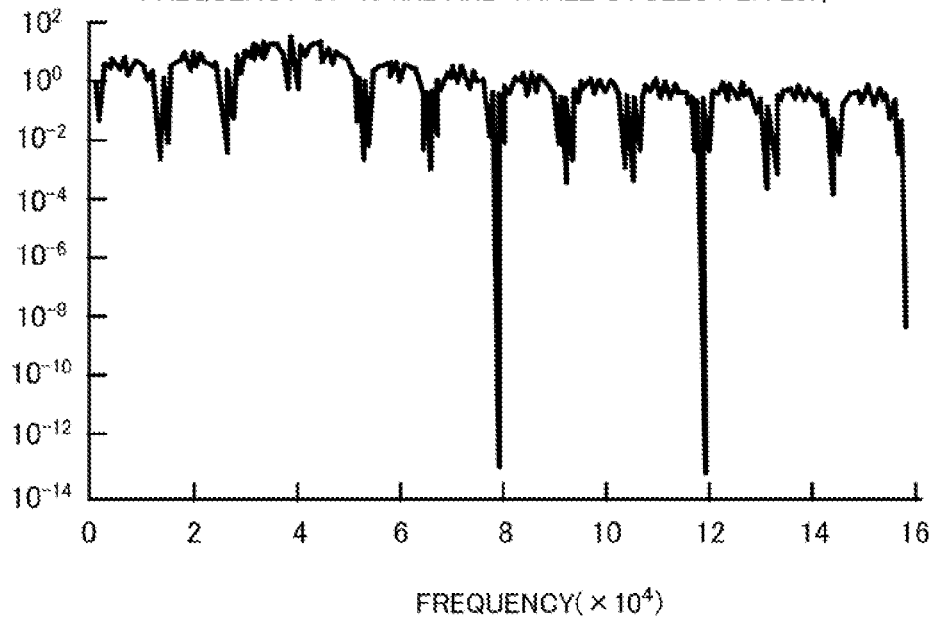
BANDWIDTH = 26.7 kHz (IN CASE OF PHASE MODULATION WITH BASIC FREQUENCY OF 40 kHz AND THREE CYCLES PER BIT)
FREQUENCY($\times 10^4$)
FIG. 15
(a) DIRECT WAVE OF M SEQUENCE ULTRASONIC WHOSE PHASE IS MODULATED WITH TWO CYCLES OF BASIC WAVE CORRESPONDING TO ONE BIT
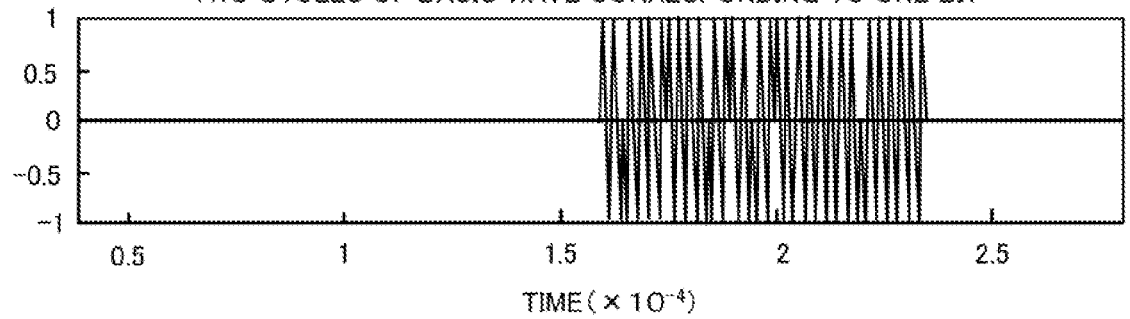
TIME($\times 10^{-4}$)
(b) WAVEFORM OF VALUE OF CORRELATION WITH M SEQUENCE MODEL WAVEFORM
100010011010111
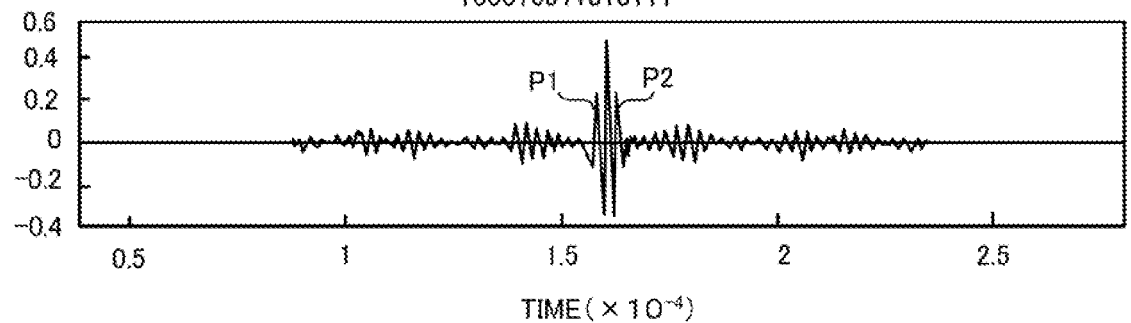
TIME($\times 10^{-4}$)

FIG. 16

(a) DIRECT WAVE OF M SEQUENCE ULTRASONIC WHOSE PHASE IS MODULATED WITH THREE CYCLES OF BASIC WAVE CORRESPONDING TO ONE BIT

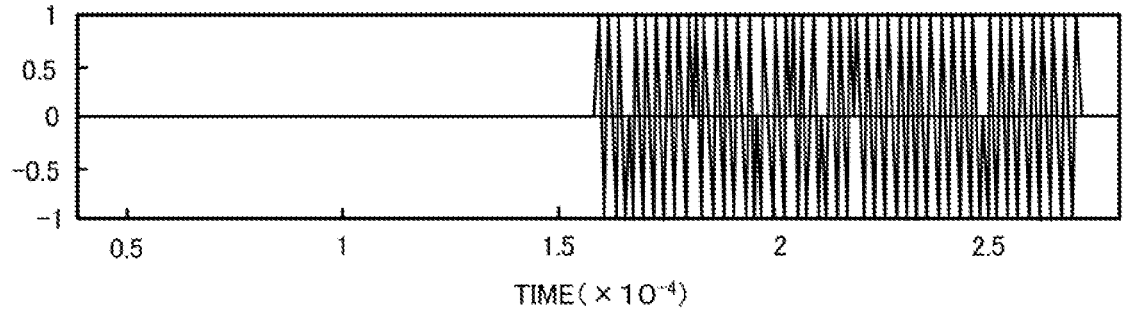

(b) WAVEFORM OF VALUE OF CORRELATION WITH M SEQUENCE MODEL WAVEFORM
1000100110101111

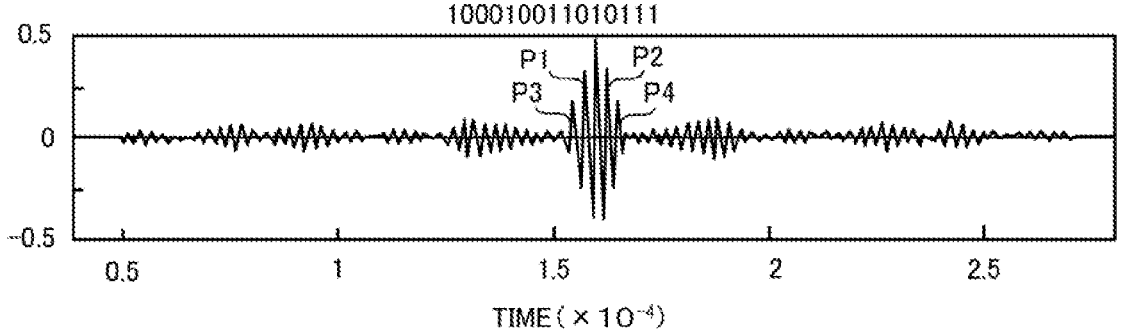

FIG. 17

(a) M SEQUENCE ULTRASONIC COMPOSITE RECEPTION WAVE WHOSE PHASE IS MODULATED WITH THREE CYCLES OF BASIC WAVE CORRESPONDING TO ONE BIT

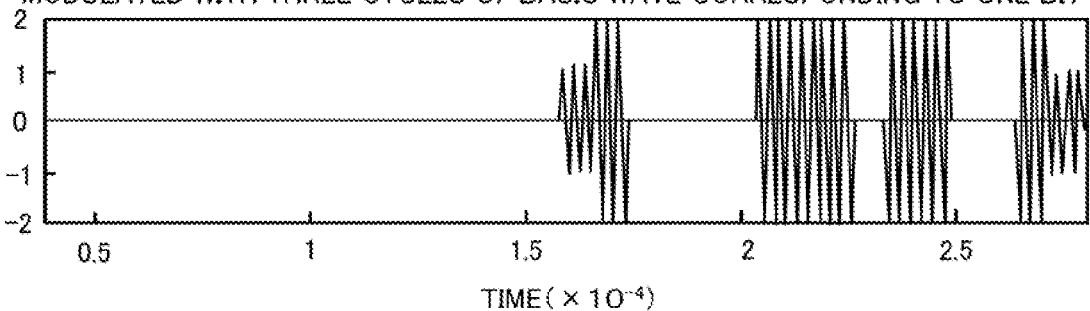

(b) WAVEFORM OF VALUE OF CORRELATION WITH M SEQUENCE MODEL WAVEFORM
1000100110101111

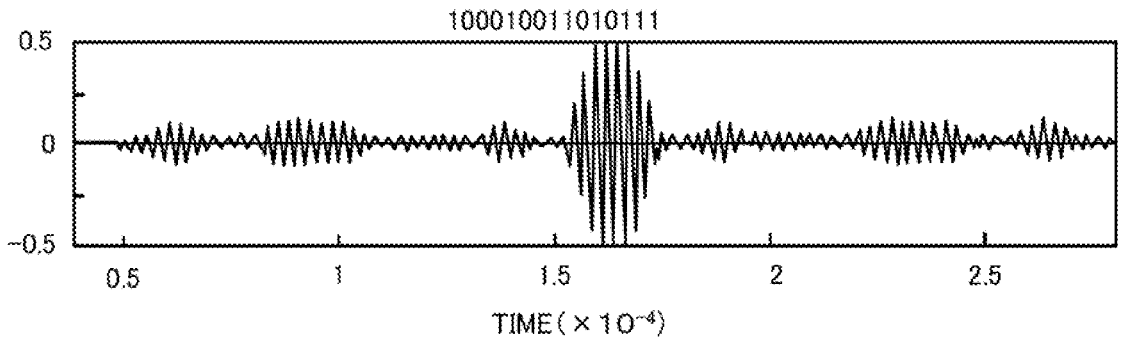

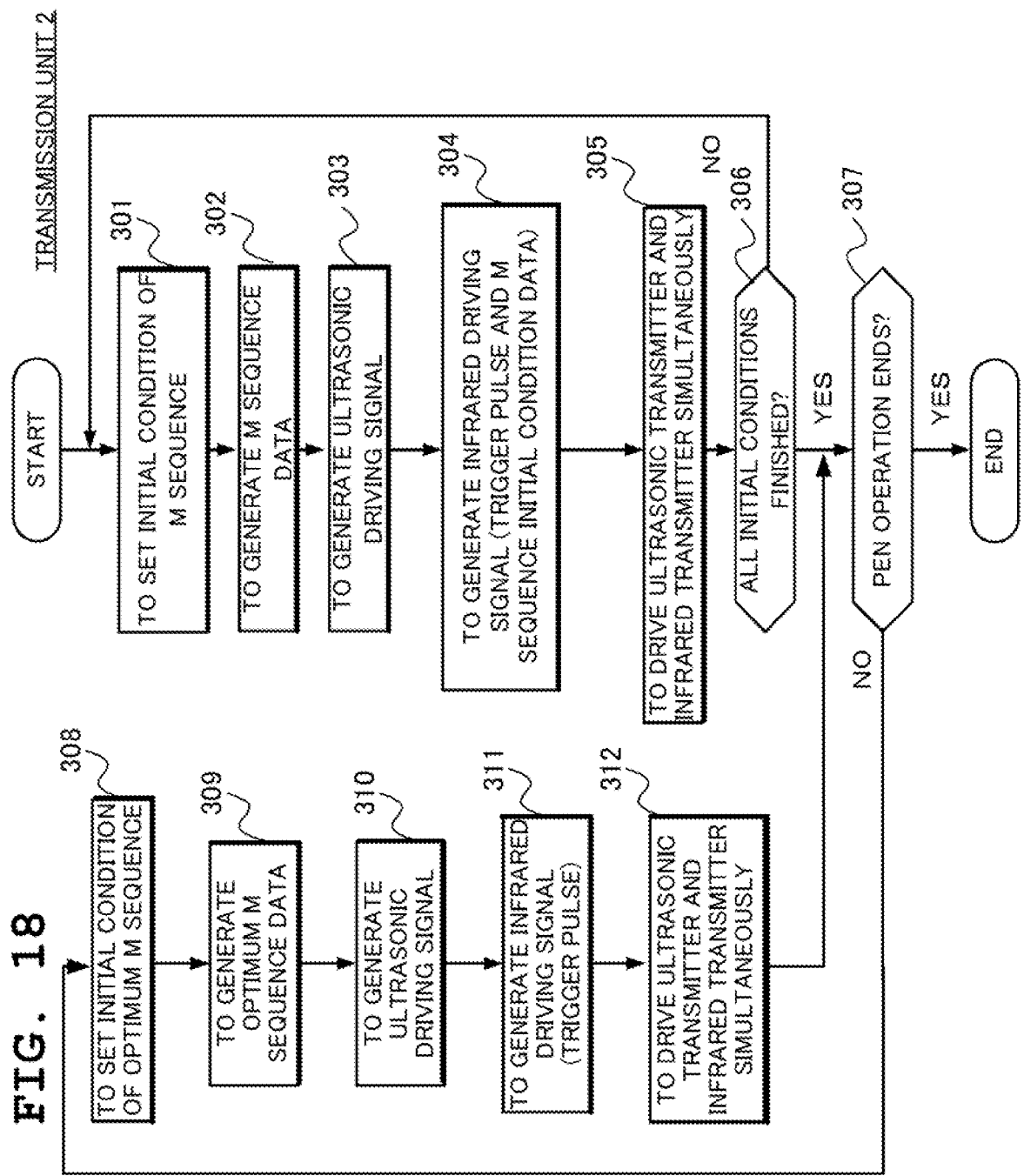

OPTIMUM PSEUDO RANDOM SEQUENCE DETERMINING METHOD, POSITION DETECTION SYSTEM, POSITION DETECTION METHOD, TRANSMISSION DEVICE AND RECEPTION DEVICE

INCORPORATION BY REFERENCE

This application is the National Phase of PCT/JP2008/065573, filed Aug. 29, 2008, which is based upon and claims the benefit of priority from Japanese patent applications No. 2007-224858, filed on Aug. 30, 2007 and No. 2008-188274, filed on Jul. 22, 2008, the disclosure of which is incorporated herein in its entirety by reference.

TECHNICAL FIELD

The present invention relates to a position detection system for detecting a position by simultaneously sending an electromagnetic wave signal and an ultrasonic signal generated based on an optimum M sequence to measure a propagation time of ultrasonic sent from a movable body to a predetermined position, and more particularly, a method of determining the optimum M sequence.

BACKGROUND ART

One example of a method of calculating a sound wave propagation time is recited in Patent Literature 1. In the conventional sound wave propagation time calculating method, with an M sequence phase modulated wave used as a transmission wave, an M sequence phase modulated wave transmitted by a transmitter is received by a receiver and the received signal and a transmission signal are correlated by a matched filter to detect a peak of an output of the matched filter, thereby calculating a propagation time of the sound wave by a peak time.

In addition, recited in Patent Literature 2 is one example of a method of reducing erroneous detection of a correlation peak caused by distortion of a sound wave at transmission and reception when an M sequence phase modulated wave is used as a transmission wave. In the convention method, with respect to a non-M sequence of a reception wave generated due to distortion of a sound wave transmitted or received, generating a signal whose amplitude of a half-cycle of a sine-wave pulse immediately precedent to a phase inversion part where the phase of the M sequence phase modulated signal is inverted by 180 degrees is set to be zero and driving a speaker to reduce distortion of a sound wave leads to suppression of a secondary peak generated due of non-M sequence.

One example of a method of measuring a propagation time of ultrasonic to detect a position is recited in Patent Literature 3. In the conventional position detection method using a propagation time of ultrasonic, an infrared trigger signal for a measurement start by an electromagnetic wave and an ultrasonic signal of the same waveform in each cycle are transmitted from an electronic pen simultaneously in a fixed cycle. The reception side measures a time from the reception of the trigger signal until the reception of the ultrasonic signal as a propagation time of the ultrasonic to determine a position of the electronic pen by using the propagation time.

Patent Literature 1: U.S. Pat. No. 3,876,370
Patent Literature 2: Patent Laying-Open No. 2002-286517
Patent Literature 3: U.S. Pat. No. 6,118,205

Ultrasonic signal will have a reflected wave generated because it might reflect on a surrounding wall or the like to arrive at a reception side through a plurality of paths whose propagation distance is different. Since the conventional ultrasonic propagation time measuring method has the same waveform in each transmission cycle, when a reception side receives a composite wave with a direct wave and a reflected wave of an ultrasonic signal after receiving a trigger signal, it is impossible to precisely extract only a direct wave because discrimination between them is difficult. In particular, a configuration of the composite wave might be changed depending on how the direct wave and the reflected wave overlap with each other to make it difficult to detect an arrival point of a first direct wave.

The conventional sound wave propagation time calculating method using an M sequence phase modulated wave has a problem that even with the addition of the method of reducing distortion of a sound wave caused by transmission/reception, when a transmission source having frequent residual oscillations is used, the method is not enough to reduce distortion of a sound wave and it is accordingly difficult to suppress a secondary correlation peak generated due to non-M sequence. The reason is that even when the transmission source is driven by a signal generated whose amplitude of a half-cycle of a sine-wave pulse immediately precedent to a phase inversion part where the phase of the M sequence phase modulated signal is inverted by 180 degrees is zero, residual oscillation is generated to interfere with oscillation by a driving signal, so that a non-M sequence remains.

SUMMARY

An object of the present invention is to provide a method of determining an optimum M sequence for generating a correlation peak distinguishable with ease, an optimum pseudo random sequence determining method which causes a peak detectable with ease by a reception side even under a disturbing environment to appear at an ultrasonic wave arrival time point by simultaneously sending a trigger electromagnetic wave signal and an ultrasonic signal formed into an M sequence by the optimum M sequence from a transmission side, a position detection system, a position detection method, a transmission device and a reception device.

According to an exemplary aspect of the invention, an optimum pseudo random sequence determining method includes the steps a) sending, from a transmission side, an ultrasonic signal modulated by data of a pseudo random sequence generated based on data which defines a pseudo random sequence having high self-correlativity, b) receiving the ultrasonic signal at a reception side, generating an ultrasonic model waveform of a pseudo random sequence of the ultrasonic signal and executing processing of correlation between the ultrasonic model waveform and the received ultrasonic signal to detect a correlation waveform, and c) with respect to data of different pseudo random sequences, repeatedly executing the Steps (a) and (b), detecting the correlation waveform in plural, detecting a smallest secondary peak among secondary peaks appearing in each correlation waveform when the ultrasonic model waveform and the received ultrasonic signal coincide in part and determining data of a pseudo random sequence corresponding to the smallest secondary peak as data of an optimum pseudo random sequence.

A position detection system according to a first exemplary aspect of the invention includes at least one transmission device and a reception device for detecting a position of the transmission device, wherein the transmission device transmits a first ultrasonic signal modulated by data of a pseudo random sequence having high self-correlativity, the reception device generates an ultrasonic model waveform of a pseudo random sequence of the first ultrasonic signal received, obtains a correlation value between a waveform of the first ultrasonic signal received and the ultrasonic model waveform generated, determines data which defines an optimum pseudo random sequence with which a secondary peak of the correlation value becomes the smallest and assigns the data to the transmission device, the transmission device simultaneously sends a trigger signal indicative of transmission timing and a second ultrasonic signal modulated by data of a pseudo random sequence generated based on data which defines an optimum pseudo random sequence assigned by the reception device, and the reception device executes correlation processing between a waveform of a second ultrasonic signal received and an ultrasonic model waveform of a pseudo random sequence of the second ultrasonic signal to specify an arrival time of the ultrasonic signal and calculates a propagation time of the ultrasonic from an arrival time point of the trigger signal and the specified arrival time to detect a position of the transmission device based on the ultrasonic propagation time calculated.

A position detection system according to a second exemplary aspect of the invention includes a plurality of transmission devices and a reception device for detecting a position of the transmission device, wherein the transmission device transmits a first ultrasonic signal modulated by data of a pseudo random sequence having high self-correlativity, the reception device generates an ultrasonic model waveform of a pseudo random sequence of the first ultrasonic signal received, obtains a correlation value between a waveform of the first ultrasonic signal received and the ultrasonic model waveform generated, determines data which defines a plurality of pseudo random sequences, starting with a sequence with which a secondary peak of the correlation value is the smallest, and assigns the data which defines the plurality of pseudo random sequences to the plurality of the transmission devices, the transmission device simultaneously sends a trigger signal indicative of transmission timing and a second ultrasonic signal modulated by data of a pseudo random sequence generated based on data which defines an optimum pseudo random sequence assigned by the reception device, and the reception device executes correlation processing between a waveform of a second ultrasonic signal received and an ultrasonic model waveform of a pseudo random sequence of the second ultrasonic signal to specify an arrival time of the ultrasonic signal and calculates a propagation time of the ultrasonic from an arrival time point of the trigger signal and the specified arrival time to detect a position of the transmission device based on the ultrasonic propagation time calculated.

A position detection system according to a third exemplary aspect of the invention includes at least one transmission device and a reception device for detecting a position of the transmission device, wherein the transmission device transmits a plurality of first ultrasonic signals modulated by data of a plurality of pseudo random sequences different from each other which have high self-correlativity, the reception device generates an ultrasonic model waveform of a pseudo random sequence of the first ultrasonic signal, executes correlation processing between each ultrasonic model waveform and a waveform of each first ultrasonic signal to detect a secondary peak of a correlation value, determines data of a pseudo random sequence which generates a smallest secondary peak among secondary peaks detected in all the correlation processing as data of an optimum pseudo random sequence and assigns the data to the transmission device, the transmission device simultaneously sends a trigger signal indicative of transmission timing and a second ultrasonic signal modulated by data of an optimum pseudo random sequence assigned by the reception device, and the reception device calculates a correlation value between a waveform of a second ultrasonic signal received and an ultrasonic model waveform of a pseudo random sequence of the second ultrasonic signal, detects a primary peak of the calculated correlation value and calculates an ultrasonic propagation time from a time point of reception of the trigger signal and a time point of detection of the primary peak to detect a position of the transmission device based on the ultrasonic propagation time calculated.

A position detection system according to a fourth exemplary aspect of the invention includes at least one transmission device and a reception device for detecting a position of the transmission device, wherein the transmission device sends a plurality of first ultrasonic signals modulated by data of a plurality of pseudo random sequences different from each other which have high self-correlativity, the reception device generates an ultrasonic model waveform of a pseudo random sequence of the plurality of the first ultrasonic signals, executes correlation processing between each ultrasonic model waveform and a waveform of each first ultrasonic signal to detect a secondary peak of a correlation value, determines data of a plurality of pseudo random sequences, starting with a sequence with which a secondary peak detected in all the correlation processing is the smallest, and assigns the data of the plurality of pseudo random sequences to each the transmission device different from each other, the transmission device simultaneously sends a trigger signal indicative of transmission timing and a second ultrasonic signal modulated by data of a pseudo random sequence assigned, and the reception device calculates a correlation value between a waveform of a second ultrasonic signal received and an ultrasonic model waveform of a pseudo random sequence of the second ultrasonic signal, detects a primary peak of the calculated correlation value and calculates an ultrasonic propagation time from a time point of reception of the trigger signal and a time point of detection of the primary peak to detect a position of the transmission device based on the ultrasonic propagation time calculated.

A position detection method according to a first exemplary aspect of the invention, wherein at least one transmission device executes the step of transmitting a first ultrasonic signal modulated by data of a pseudo random sequence having high self-correlativity, a reception device for detecting a position of the transmission device executes the step of generating an ultrasonic model waveform of a pseudo random sequence of the first ultrasonic signal received, obtaining a correlation value between a waveform of the first ultrasonic signal received and the ultrasonic model waveform generated, determining data which defines an optimum pseudo random sequence with which a secondary peak of the correlation value becomes the smallest and assigning the data to the transmission device, the transmission device executes the step of simultaneously sending a trigger signal indicative of transmission timing and a second ultrasonic signal modulated by data of a pseudo random sequence generated based on data which defines an optimum pseudo random sequence assigned by the reception device, and the reception device executes the step of executing correlation processing between a waveform of a second ultrasonic signal received and an ultrasonic model waveform of a pseudo random sequence of the second ultrasonic signal to specify an arrival time of the ultrasonic signal, calculating a propagation time of the ultrasonic from an arrival time point of the trigger signal and the specified arrival time and detecting a position of the transmission device based on the ultrasonic propagation time calculated.

A position detection method according to a second exemplary aspect of the invention, wherein a plurality of transmission devices execute the step of transmitting a first ultrasonic signal modulated by data of a pseudo random sequence having high self-correlativity, a reception device for detecting a position of the transmission device executes the step of generating an ultrasonic model waveform of a pseudo random sequence of the first ultrasonic signal received, obtaining a correlation value between a waveform of the first ultrasonic signal received and the ultrasonic model waveform generated, determining data which defines a plurality of pseudo random sequences, starting with a sequence with which a secondary peak of the correlation value is the smallest, and assigning the data which defines the plurality of pseudo random sequences to the plurality of the transmission devices, the transmission device executes the step of simultaneously sending a trigger signal indicative of transmission timing and a second ultrasonic signal modulated by data of a pseudo random sequence generated based on data which defines an optimum pseudo random sequence assigned by the reception device, and the reception device executes the step of executing correlation processing between a waveform of a second ultrasonic signal received and an ultrasonic model waveform of a pseudo random sequence of the second ultrasonic signal to specify an arrival time of the ultrasonic signal, calculating a propagation time of the ultrasonic from an arrival time point of the trigger signal and the specified arrival time and detecting a position of the transmission device based on the ultrasonic propagation time calculated.

A position detection method according to a third exemplary aspect of the invention, wherein at least one transmission device executes the step of sending out a plurality of first ultrasonic signals modulated by data of a plurality of pseudo random sequences different from each other which have high self-correlativity, a reception device for detecting a position of the transmission device executes the step of generating an ultrasonic model waveform of a pseudo random sequence of the first ultrasonic signal, executing correlation processing between each ultrasonic model waveform and a waveform of each first ultrasonic signal to detect a secondary peak of a correlation value, determining data of a pseudo random sequence which generates a smallest secondary peak among secondary peaks detected in all the correlation processing as data of an optimum pseudo random sequence and assigning the data to the transmission device, the transmission device executes the step of simultaneously sending a trigger signal indicative of transmission timing and a second ultrasonic signal modulated by data of an optimum pseudo random sequence assigned by the reception device, and the reception device executes the step of calculating a correlation value between a waveform of a second ultrasonic signal received and an ultrasonic model waveform of a pseudo random sequence of the second ultrasonic signal, detecting a primary peak of the calculated correlation value, calculating an ultrasonic propagation time from a time point of reception of the trigger signal and a time point of detection of the primary peak to detect a position of the transmission device based on the ultrasonic propagation time calculated.

A position detection method according to a fourth exemplary aspect of the invention, wherein at least one transmission device executes the step of sending a plurality of first ultrasonic signals modulated by data of a plurality of pseudo random sequences different from each other which have high self-correlativity, a reception device for detecting a position of the transmission device executes the step of generating an ultrasonic model waveform of a pseudo random sequence of the plurality of the first ultrasonic signals, executing correlation processing between each ultrasonic model waveform and a waveform of each first ultrasonic signal to detect a secondary peak of a correlation value, determining data of a plurality of pseudo random sequences, starting with a sequence with which a secondary peak detected in all the correlation processing is the smallest, and assigning the data of the plurality of pseudo random sequences to each the transmission device different from each other, the transmission device executes the step of simultaneously sending a trigger signal indicative of transmission timing and a second ultrasonic signal modulated by data of a pseudo random sequence assigned, and the reception device executes the step of calculating a correlation value between a waveform of a second ultrasonic signal received and an ultrasonic model waveform of a pseudo random sequence of the second ultrasonic signal, detecting a primary peak of the calculated correlation value and calculating an ultrasonic propagation time from a time point of reception of the trigger signal and a time point of the detection of the primary peak to detect a position of the transmission device based on the ultrasonic propagation time calculated.

According to a first exemplary aspect of the invention, a transmission device of a position detection system for detecting a position of the transmission device by receiving an ultrasonic signal sent by a reception device from the transmission device, wherein the transmission device includes a unit for transmitting a first ultrasonic signal modulated by data of a pseudo random sequence having high self-correlativity, and simultaneously sending a trigger signal indicative of transmission timing and a second ultrasonic signal modulated by data of a pseudo random sequence generated based on data which defines an optimum pseudo random sequence assigned by the reception device.

According to a second exemplary aspect of the invention, a transmission device of a position detection system for detecting a position of the transmission device by receiving an ultrasonic signal sent by a reception device from the transmission device, wherein the transmission device includes a unit for transmitting a plurality of first ultrasonic signals modulated by data of a plurality of pseudo random sequences different from each other which have high self-correlativity, and simultaneously sending a trigger signal indicative of transmission timing and a second ultrasonic signal modulated by data of an optimum pseudo random sequence assigned by the reception device.

According to a first exemplary aspect of the invention, a reception device of a position detection system for detecting a position of a transmission device by receiving an ultrasonic signal transmitted by the reception device from the transmission device, comprising:

a unit for receiving a first ultrasonic signal modulated by data of a pseudo random sequence having high self-correlativity which is transmitted from the transmission device, generating an ultrasonic model waveform of a pseudo random sequence of the first ultrasonic signal received, obtaining a correlation value between a waveform of the first ultrasonic signal received and the ultrasonic model waveform generated, determining data which defines an optimum pseudo random sequence with which a secondary peak of the correlation value becomes the smallest and assigning the data to the transmission device, and a unit for receiving a trigger signal indicative of transmission timing and a second ultrasonic signal modulated by data of a pseudo random sequence generated based on data which defines an optimum pseudo random sequence assigned by the reception device, which signals are simultaneously transmitted from the transmission device, executing correlation processing between a waveform of a second ultrasonic signal received and an ultrasonic model waveform of a pseudo random sequence of the second ultrasonic signal to specify an arrival time of the ultrasonic signal, calculating a propagation time of the ultrasonic from an arrival time point of the trigger signal and the specified arrival time and detecting a position of the transmission device based on the ultrasonic propagation time calculated.

According to a second exemplary aspect of the invention, a reception device of a position detection system for detecting a position of a transmission device by receiving an ultrasonic signal transmitted by the reception device from the transmission device, comprising:

a unit for receiving first ultrasonic signals modulated by data of a pseudo random sequence having high self-correlativity which are transmitted by a plurality of the transmission devices, generating an ultrasonic model waveform of a pseudo random sequence of the first ultrasonic signal received, obtaining a correlation value between a waveform of the first ultrasonic signal received and the ultrasonic model waveform generated, determining data which defines a plurality of pseudo random sequences starting with a sequence with which a secondary peak of the correlation value is the smallest and assigning the data which defines the plurality of pseudo random sequences to the plurality of the transmission devices, and a unit for receiving a trigger signal indicative of transmission timing and a second ultrasonic signal modulated by data of a pseudo random sequence generated based on data which defines an optimum pseudo random sequence assigned by the reception device, which signals are simultaneously transmitted by the transmission device, executing correlation processing between a waveform of a second ultrasonic signal received and an ultrasonic model waveform of a pseudo random sequence of the second ultrasonic signal to specify an arrival time of the ultrasonic signal, calculating a propagation time of the ultrasonic from an arrival time point of the trigger signal and the specified arrival time and detecting a position of the transmission device based on the ultrasonic propagation time calculated.

According to a third exemplary aspect of the invention, a reception device of a position detection system for detecting a position of a transmission device by receiving an ultrasonic signal transmitted by the reception device from the transmission device, comprising:

a unit for receiving a plurality of first ultrasonic signals modulated by data of a plurality of pseudo random sequences different from each other and having high self-correlativity which are transmitted from at least one transmission device, generating an ultrasonic model waveform of a pseudo random sequence of the first ultrasonic signal received, executing correlation processing between each ultrasonic model waveform and a waveform of each first ultrasonic signal to detect a secondary peak of a correlation value, determining data of a pseudo random sequence which generates a smallest secondary peak among secondary peaks detected in all the correlation processing as data of an optimum pseudo random sequence and assigning the data to the transmission device, and a unit for receiving a trigger signal indicative of transmission timing and a second ultrasonic signal modulated by data of an optimum pseudo random sequence assigned by the reception device, which signals are simultaneously transmitted by the transmission device, calculating a correlation value between a waveform of a second ultrasonic signal received and an ultrasonic model waveform of a pseudo random sequence of the second ultrasonic signal, detecting a primary peak of the calculated correlation value, and calculating an ultrasonic propagation time from a time point of reception of the trigger signal and a time point of detection of the primary peak to detect a position of the transmission device based on the ultrasonic propagation time calculated.

According to a fourth exemplary aspect of the invention, a reception device of a position detection system for detecting a position of a transmission device by receiving an ultrasonic signal transmitted by the reception device from the transmission device, comprising:

a unit for receiving a plurality of first ultrasonic signals modulated by data of a plurality of pseudo random sequences different from each other and having high self-correlativity, which signals are transmitted by the transmission device, generating an ultrasonic model waveform of a pseudo random sequence of the plurality of the first ultrasonic signals received, executing correlation processing between each ultrasonic model waveform and a waveform of each first ultrasonic signal to detect a secondary peak of a correlation value, determining data of a plurality of pseudo random sequences, starting with a sequence with which a secondary peak detected in all the correlation processing is the smallest, and assigning the data of the plurality of pseudo random sequences to the transmission devices different from each other, and a unit for receiving a trigger signal indicative of transmission timing and a second ultrasonic signal modulated by data of a pseudo random sequence assigned, which signals are simultaneously transmitted by the transmission device, calculating a correlation value between a waveform of a second ultrasonic signal received and an ultrasonic model waveform of a pseudo random sequence of the second ultrasonic signal, detecting a primary peak of the calculated correlation value, and calculating an ultrasonic propagation time from a time point of reception of the trigger signal and a time point of detection of the primary peak to detect a position of the transmission device based on the ultrasonic propagation time calculated.

Since the present invention uses an ultrasonic signal modulated by data of a pseudo random sequence whose secondary peak component of a correlation value is small, which peak appears due to partial coincidence, with a model waveform, of an ultrasonic waveform received at the time point of detection of a primary peak of a correlation value, that is, in the surroundings of the ultrasonic arrival time point, a peak detectable with ease even under the environments of disturbance such as a reflected wave or noise appears at the ultrasonic arrival time point.

BRIEF DESCRIPTION OF THE DRAWINGS

FIG. 14 is a diagram showing a bandwidth of ultrasonic having a basic frequency of 40 kHz whose phase is modulated in three cycles per bit;

FIG. 15 shows a waveform of a correlation value between a direct wave of M sequence ultrasonic whose phase is modulated in two cycles per bit and an M sequence model waveform;

FIG. 16 shows a waveform of a correlation value between a direct wave of M sequence ultrasonic whose phase is modulated in three cycles per bit and an M sequence model waveform;

FIG. 17 shows a waveform of a value of correlation between a composite waveform with a direct wave of M sequence ultrasonic whose phase is modulated in three cycles per bit and a reflected wave three cycles behind, and an M sequence model waveform;

FIG. 18 is a flow chart showing operation of a transmission device according to a second exemplary embodiment of the present invention.

EXEMPLARY EMBODIMENT

Figure 1:
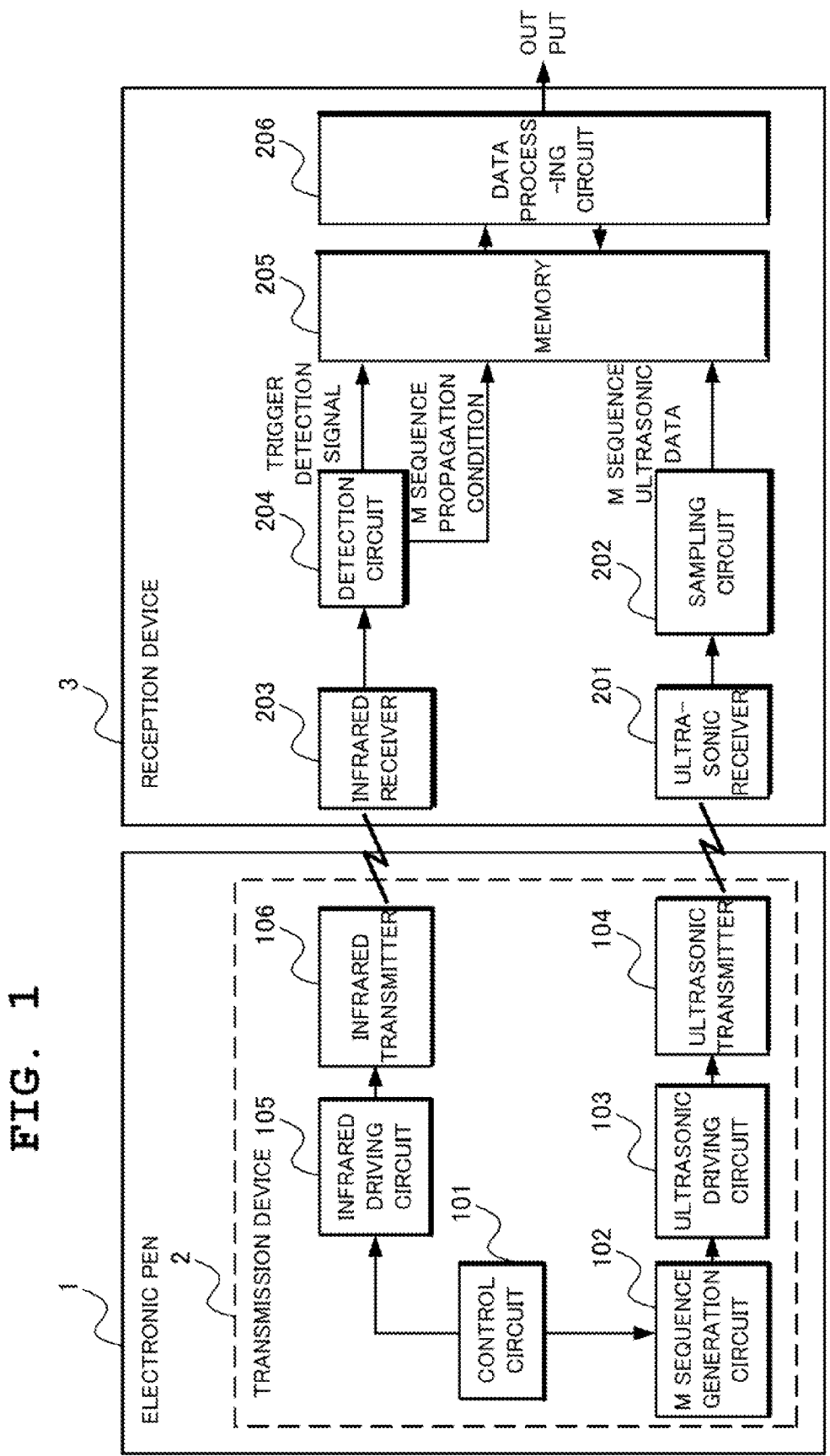
FIG. 1 is a block diagram showing a structure of a transmission device and a reception device of the present invention.

Next, a first best mode for implementing the present invention will be described in detail with reference to FIG. 1 through FIG. 19. In FIG. 1, an ultrasonic propagation time measuring system according to the present invention comprises a transmission device 2 attached to an electronic pen 1 as a movable body, and a reception device 3 disposed at a predetermined position apart from the transmission device. The present measuring system searches an optimum M sequence (hereinafter, referred to as an M sequence search mode) prior to measurement of an ultrasonic propagation time.

The transmission device 2 comprises a control circuit 101, an M sequence generation circuit 102, an ultrasonic driving circuit 103, an ultrasonic transmitter 104, an infrared driving circuit 105 and an infrared transmitter 106. M sequence generated by the M sequence generation circuit 102 is a sequence generated by a characteristic polynomial, which is obtained by defining a characteristic polynomial and an initial condition. Details of an M sequence are described in, for example, Hiroshi Kashiwagi, "M-sequence and Its Applications" (Shokodo, Mar. 25, 1996). Used, for example, is a data string whose sequence length generated by a quartic characteristic polynomial $(fx)=x^4+x+1$ is 15 bits. By changing an initial condition, 15 different data strings whose data arrangement is circularly shifted are obtained.

In the M sequence search mode, the control circuit 101 determines an initial condition of an M sequence based on a predetermined characteristic polynomial and transmits the initial condition to the M sequence generation circuit 102 and the infrared driving circuit 105 in a fixed transmission cycle. The M sequence generation unit 102 generates an M-sequence coded bit string differing in each transmission cycle according to the initial condition. The ultrasonic driving circuit 103 supplies the ultrasonic transmitter 104 with the M sequence data as a driving signal for ultrasonic modulation. The ultrasonic transmitter 104 modulates the ultrasonic by the driving signal as a modulation signal and sends the M sequence modulated ultrasonic signal into space. Used as a preferred embodiment is a phase modulation method for the modulation of ultrasonic. On the other hand, the control circuit 101 instructs the infrared driving circuit 105 to generate a trigger signal and subsequently supplies the infrared driving circuit 105 with initial condition data which is obtained by coding the above-described initial condition of the M sequence. In synchronization with the transmission timing of the ultrasonic transmitter 104, the infrared transmitter 106 is driven by the output of the infrared driving circuit 105 to send an infrared into space through the electronic pen 1.

As will be described later, an M sequence optimum in the M sequence search mode is determined. In an ultrasonic propagation time measuring mode to follow, the control circuit 101 determines an initial condition of an optimum M sequence generated by a predetermined characteristic polynomial and transmits the initial condition to the M sequence generation circuit 102 and the infrared driving circuit 105.

The M sequence generation circuit 102 generates optimum M sequence data according to the initial condition. The ultrasonic driving circuit 103 supplies the ultrasonic transmitter 104 with the optimum M sequence data as a driving signal for ultrasonic modulation. The ultrasonic transmitter 104 modulates the ultrasonic with the driving signal as a modulation signal and sends the M sequence modulated ultrasonic signal into space.

Figure 2:
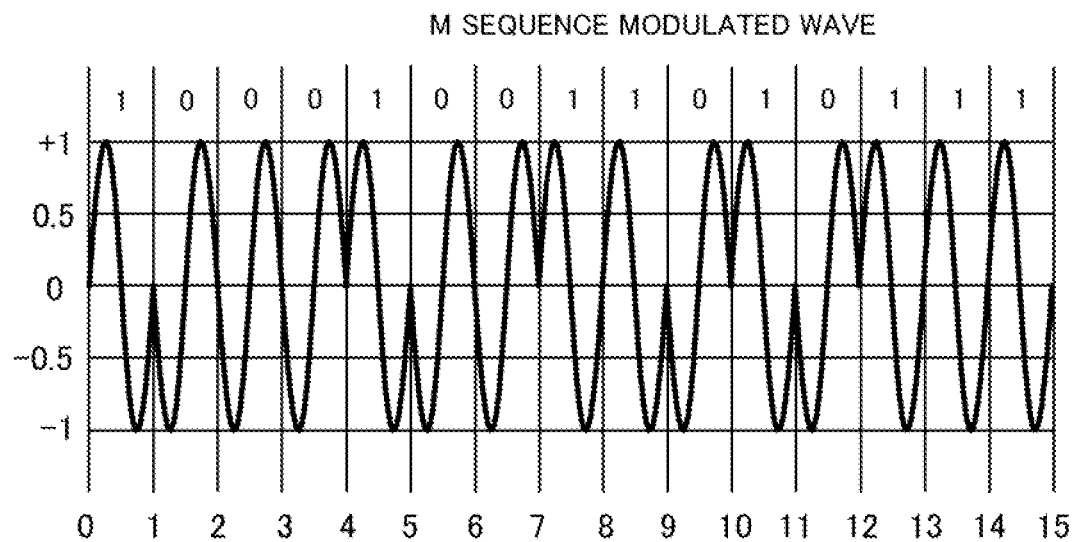
FIG. 2 shows ultrasonic M sequence data modulated by a phase modulation method in which one cycle is assigned to one bit.

FIG. 2 shows a waveform of a modulated wave whose phase is modulated by an M sequence as one example of coding by an M sequence. Shown is a waveform of an ultrasonic signal obtained by phase-modulating ultrasonic of a fixed frequency by a 15-bit M sequence "100010011010111". In the present waveform, one cycle of a basic wave (e.g. 40 kHz) corresponds to one bit, which has an inverted phase in a case of 0 and has a phase modulated to have the same phase in a case of 1, and a modulated wave has a length equivalent to 15 cycles of the basic wave.

On the other hand, the control circuit 101 instructs the infrared driving circuit 105 to generate a trigger signal and subsequently supplies the infrared driving circuit 105 with initial condition data of an optimum M sequence. In synchronization with the transmission timing of the ultrasonic transmitter 104, the infrared transmitter 106 is driven by the output of the infrared driving circuit 105 to send an infrared into space through the electronic pen 1.

The reception device 3 comprises an ultrasonic receiver 201, a sampling circuit 202, an infrared receiver 203, a detection circuit 204, a memory 205 and a data processing circuit 206.

The infrared receiver 203 receives an infrared signal from the electronic pen 1 and converts the same into an electric signal. Upon detecting a trigger pulse from an output of the infrared receiver 203, the detection circuit 204 stores an arrival time of the trigger pulse in the memory 205 and then detects initial condition data of an M sequence and stores the same in the memory 205.

The ultrasonic receiver 201 receives an ultrasonic signal transmitted from the electronic pen 1 and converts the same into an electric signal of an M sequence code. The sampling circuit 202 samples the output of the ultrasonic receiver 201 at fixed sampling intervals ($\Box$T) and sequentially stores waveform data of the sampled ultrasonic in the memory 205. Execute filtering processing as required in order to remove noise.

Figure 3:
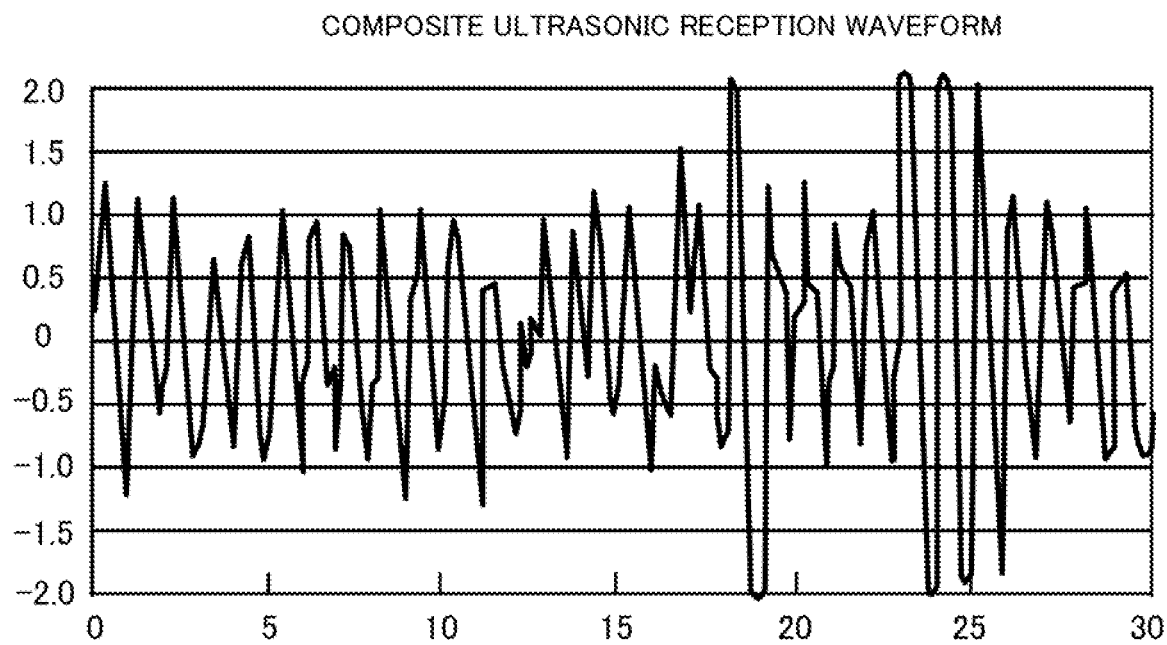
FIG. 3 shows an M sequenced ultrasonic reception waveform with a direct wave, a reflected wave and noise composed.
Figure 4:
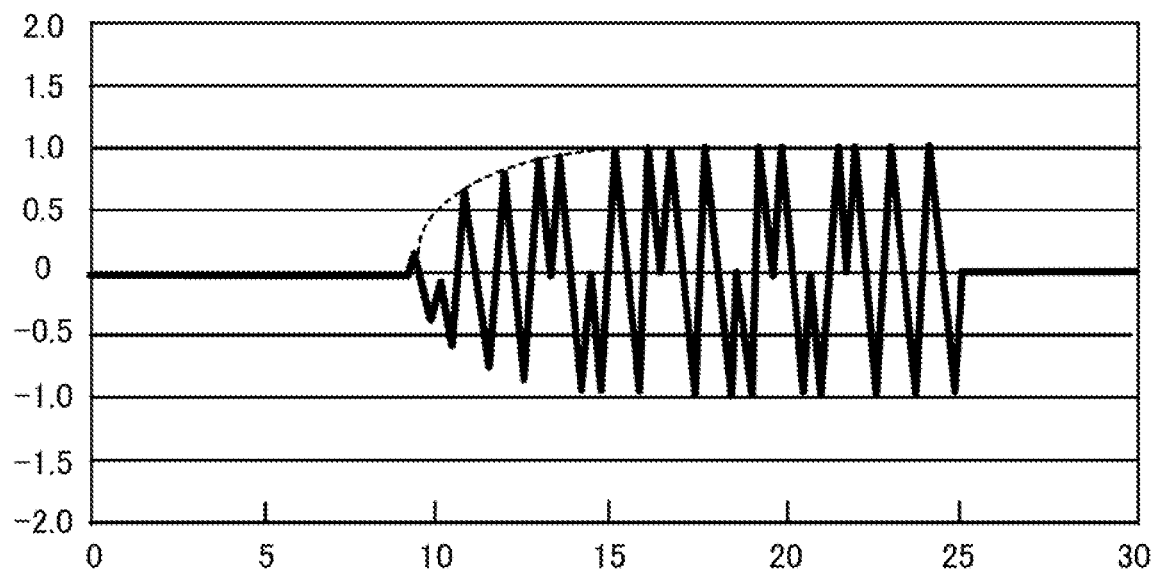
FIG. 4 shows a direct wave waveform of M sequenced ultrasonic.
Figure 5:
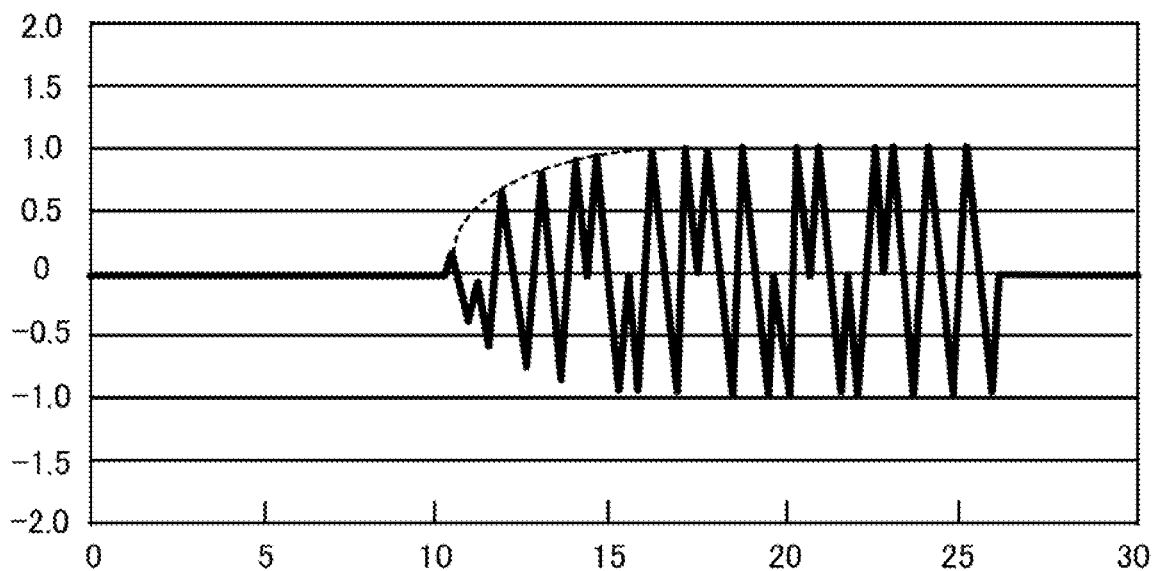
FIG. 5 shows a reflected wave waveform of M sequenced ultrasonic.
Figure 6:
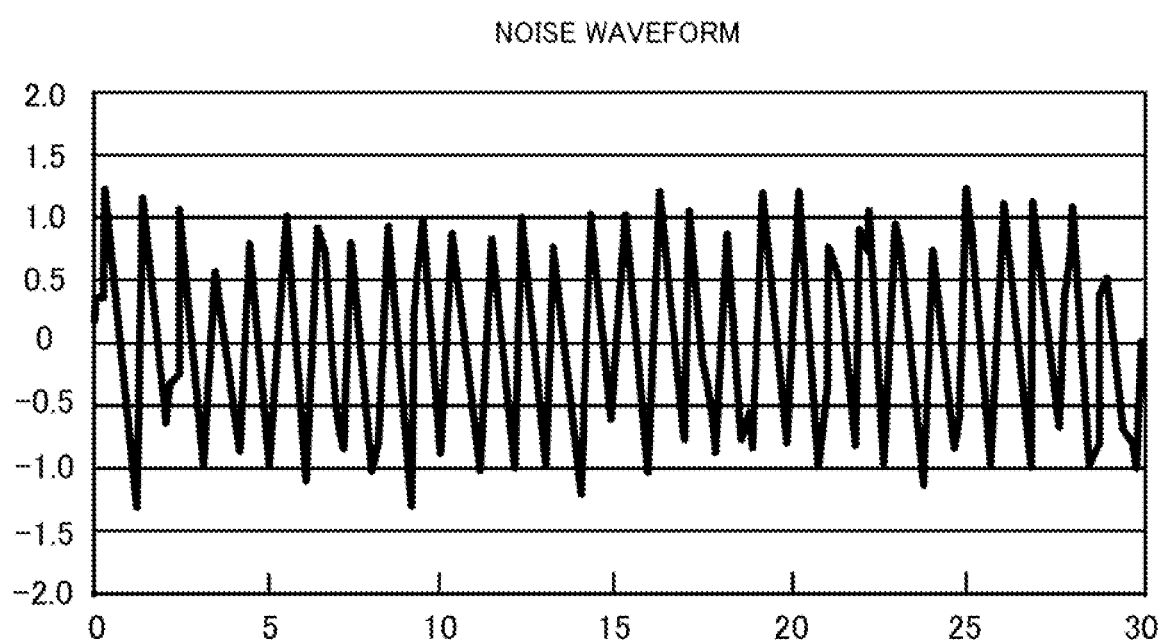
FIG. 6 shows noise waveform.

FIG. 3 shows a waveform of received ultrasonic whose phase is modulated by a 15-bit M sequence data string "100010011010111". Shown is a waveform of received ultrasonic which is stored in the memory 205 with a sampling interval ($\Box$T) as one-eighth the basic wave frequency of the ultrasonic. The abscissa represents time with a time point of reception of the infrared trigger signal as 0. When ultrasonic whose frequency is 40 kHz is used, the basic frequency of the ultrasonic will be 25 μsec and the sampling interval will be 3.125 μsec. A waveform of received ultrasonic which is stored in the memory 205 (FIG. 3) will be a composite waveform with a direct wave (FIG. 4) or a reflected wave (FIG. 5) of transmitted ultrasonic and noise (FIG. 6) mixed.

When data indicative of a trigger pulse arrival time is stored in the memory 205, the data processing circuit 206 reads the initial condition data of the M sequence and generates an M sequence model waveform based on the initial condition (furthermore, a characteristic polynomial as required) to execute processing of correlation with an ultrasonic waveform stored in the memory 205.

In the M sequence search mode, an infrared signal and an ultrasonic signal are repeatedly sent from the electronic pen. At that time, a different M sequence is used at each transmission. At each reception, check how an M sequence used is optimum based on a plurality of secondary peaks occurring when the configurations partially coincide with each other in the correlation with an M sequence model waveform of ultrasonic. The smaller a value of the largest secondary peak becomes, the highly evaluated is an M sequence. Among all the M sequences, an M sequence whose value of its largest secondary peak is the smallest is determined as an optimum M sequence.

In the ultrasonic propagation measuring mode, an infrared signal and an ultrasonic signal generated based on an optimum M sequence are sent to execute correlation processing. Upon detecting a first peak of a correlation value, the data processing circuit 206 calculates a lapse of time from the trigger pulse arrival time until a time point where the peak is detected, that is, a propagation time of the ultrasonic signal from the electronic pen 1 to the reception device 3.

Next, operation of the control circuit 101 of the transmission device 2 according to the first exemplary embodiment of the present invention will be described with reference to the flow chart of FIG. 7 and then, operation of the data processing circuit 206 of the reception device 3 will be described with reference to the flow chart of FIG. 8.

Figure 7:
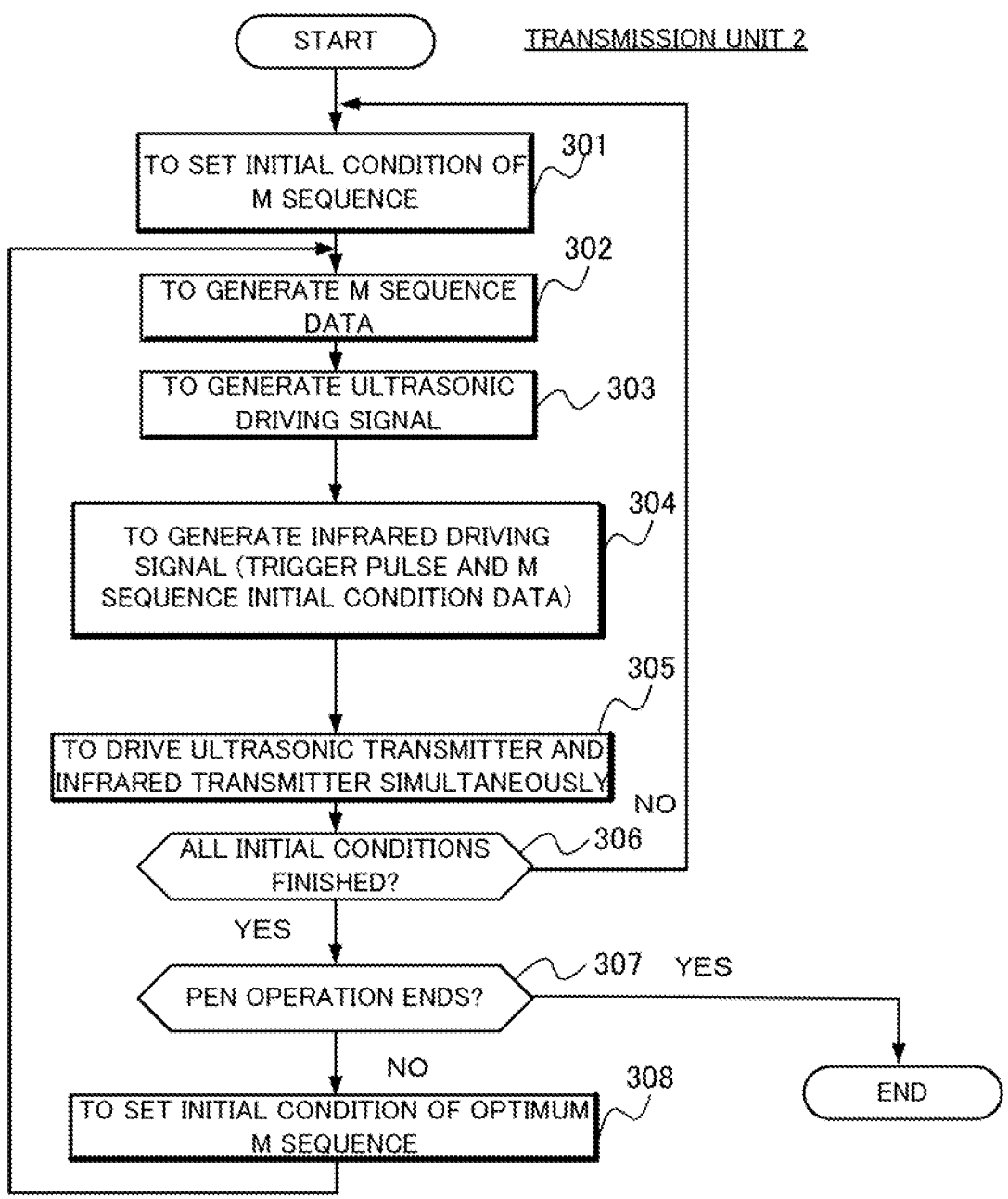
FIG. 7 is a flow chart showing operation of a transmission device according to a first exemplary embodiment of the present invention.

First in FIG. 7, in the M sequence search mode, the control circuit 101 selects an arbitrary M sequence from a plurality of M sequences different from each other to set an initial condition of the M sequence (Step 301). The M sequence generation circuit 102 generates M sequence data based on the initial condition (Step 302) and supplies the same to the ultrasonic driving circuit 103. The ultrasonic driving circuit 103 generates a driving signal for modulating ultrasonic (modulation signal) from the M sequence data (Step 303). In addition, when determining the M sequence initial condition, the control circuit 101 supplies the infrared driving circuit 105 with a trigger pulse and the M sequence initial condition data to generate an infrared driving signal (Step 304). When both the driving signals are generated at Steps 303 and 304, the infrared transmitter 106 and the ultrasonic transmitter 104 are simultaneously driven by both outputs of the infrared driving circuit 105 and the ultrasonic driving circuit 103 to send an ultrasonic signal modulated by the infrared and the M sequence into space through the electronic pen 1 (Step 305).

When Step 305 is executed, the control circuit 101 determines whether all the M sequence initial conditions are checked or not at the determination Step 306. When transmission of all the M sequences is yet to be completed, the control circuit 101 returns to Step 301 from Step 306 and then sets a subsequent M sequence initial condition. Accordingly, until transmission of all the M sequences is completed, Steps 301 through 305 will be sequentially executed, so that a plurality of ultrasonic signals modulated by different M sequences will be sequentially sent out. Then, simultaneously with the sending-out of each ultrasonic signal, a plurality of infrared signals modulated by these M sequence initial conditions and trigger pulses will be sequentially sent out. In a case of an ultrasonic signal whose phase is modulated by a 15-bit M sequence shown in FIG. 2, the processing of Steps 301 though 305 will be repeated 15 times to examine 15 kinds of M sequence data.

When transmission of all the M sequences is finished (Step S306), the system enters the ultrasonic propagation time measuring mode. The control circuit 101 checks whether pen operation ends or not (Step 307) and when in pen operation, the optimum M sequence initial condition determined by the reception device 3 is set at the control circuit 101 as will be described later (Step 308) to return to Step 302, generate optimum M sequence data, generate a trigger pulse and optimum M sequence initial condition data by the infrared driving circuit 105 at Step 303 and generate an optimum M-sequenced ultrasonic driving signal at the ultrasonic driving circuit 103 at Step 304. These driving signals cause the optimum M-sequenced ultrasonic signal and its corresponding infrared signal to be simultaneously sent out from the electronic pen (Step 305). Since the system is in the measurement mode, the next determination Step 306 will have YES and until the pen operation is completed, the control circuit 101 sequentially executes Steps 308, 302, 303, 304 and 305 in repetition.

Figure 8:
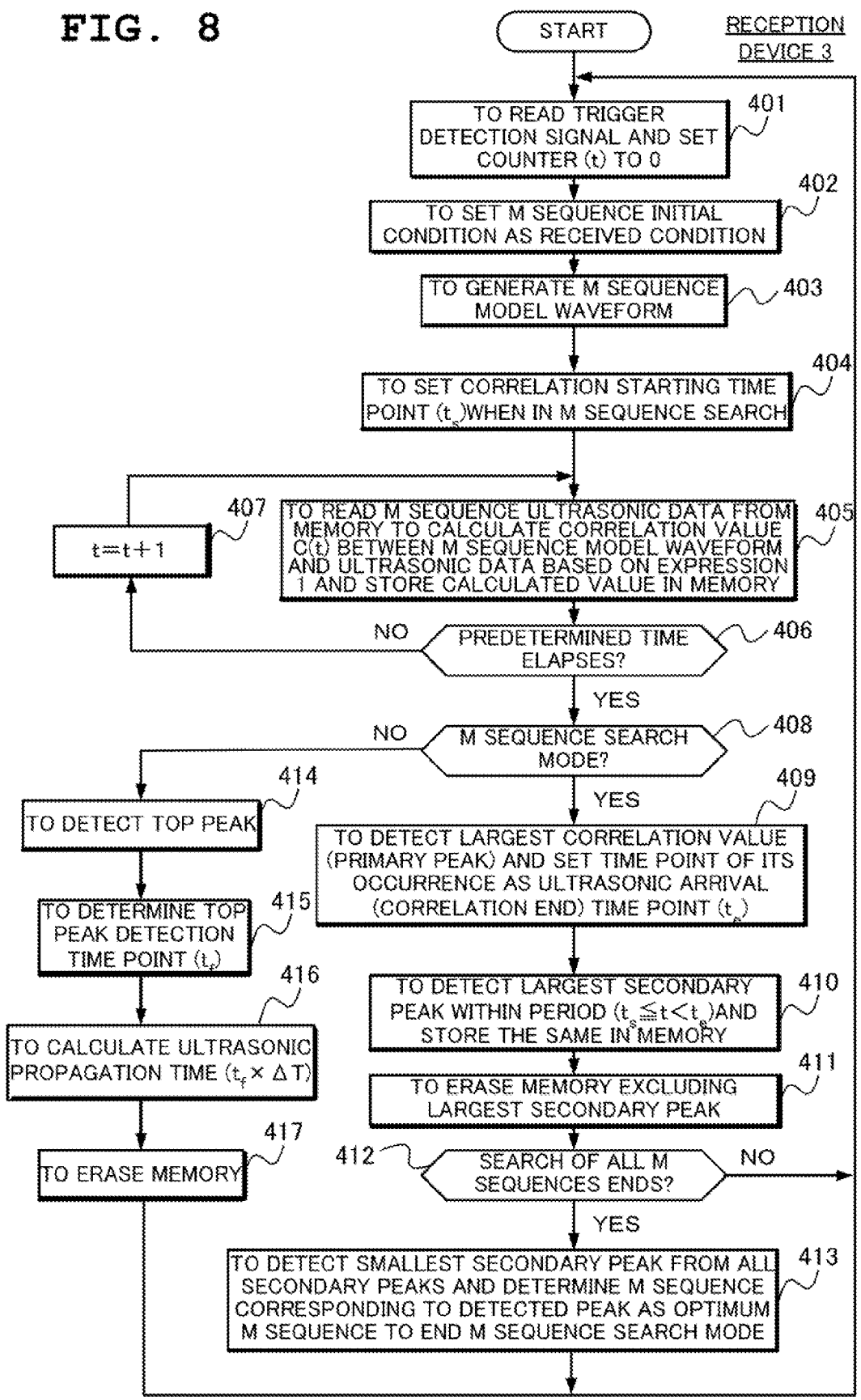
FIG. 8 is a flow chart showing operation of a reception device according to a first exemplary embodiment of the present invention.

Before the data processing circuit 206 in the reception device 3 executes the flow chart of FIG. 8, the sampling circuit 202 samples a signal received by the ultrasonic receiver 201 at fixed sampling intervals and stores the sampled ultrasonic waveform data into the memory 205. On the other hand, the detection circuit 204 detects a trigger detection signal and M sequence initial condition data from the signal received by the infrared receiver 203 and stores the same into the memory 205.

When reading a trigger detection signal from the memory 205 at Step 401, the data processing circuit 206 sets the sampling counter value "t" (sampling time) to "0", sets the M sequence initial condition to be the initial condition stored in the memory at Step 402 and generates an M sequence model waveform based on the initial condition to phase-modulate the ultrasonic by the model waveform according to the number of cycles of the ultrasonic assigned to each one bit (Step 403). When in search of an M sequence, the data processing circuit 206 sets a correlation starting time point ($t_s$) at Step 404 to proceed to the correlation value calculation Step 405.

At Step 405, first, a number N of pieces of M sequence ultrasonic data are read from the memory 205, so that calculation of correlation with the model waveform generated at Step 403 is executed to calculate a correlation value C(t) based on the Numerical Expression 1 and store the same in the memory.

(NUMERICAL EXPRESSION 1)

$$C(t) = \frac{1}{N}\sum_{i=0}^{N-1} r(i)f(i+t) \qquad (1)$$

In the Expression 1, i is an integral value which represents a sampling time as a variable, N represents the number of samples of a model waveform, r(i) represents a value of a model waveform at a sampling time i, and f(i+t) represents a value of a waveform at a sampling time (i+t).

Determine whether a predetermined time has elapsed or not from the correlation processing start at Step 406 and when it fails to elapse, advance the sampling time t by the unit amount 1 at Step 407 to return to Step 405. The correlation calculation will be executed until a predetermined time elapses to store a plurality of correlation values in the memory 205.

When the predetermined time elapses from the correlation start, determine whether an M sequence is being searched or not at Step 408 and when in M sequence search, detect the largest correlation value (primary peak) from the correlation values stored in the memory 205 at Step 409 and set a time point of the occurrence as an ultrasonic arrival (correlation end) time point ($t_e$). At Step 410, the data processing circuit 206 detects the largest correlation value in a period from the correlation starting time point until immediately before the correlation ending time point, that is, in $t_s \leq t < t_e$ based on a Numerical Expression 2.

$$P(n)=\max\{C(t)\},(t_s \leq t < t_e) \qquad (2)$$

Here, P(n) represents a largest value of the correlation value C(t) in the period ($t_s \leq t < t_e$) before the ultrasonic arrival time point in a certain M sequence initial condition n. This period is a period where a configuration of arriving ultrasonic partially coincides with the model waveform, and a correlation value appearing as a result will be referred to as a secondary peak. The detected largest secondary peak is stored in the memory 205.

Next, the ultrasonic data and all the correlation values stored in the memory 205 are erased at Step 411 to prepare for storage of ultrasonic data, a trigger detection signal and M sequence initial condition data which will arrive next.

The data processing circuit 206 determines whether search of all the M sequences is completed or not at Step 412 and when it is yet to be completed, returns to Step 401 to monitor the memory 205 for the detection of arrival of subsequent infrared signal and ultrasonic signal and read the trigger detection signal. When search of all the M sequences is completed, the data processing circuit 206 proceeds to Step 413 to detect the smallest secondary peak among all the secondary peaks stored in the memory 205, determine an M sequence corresponding to the peak as an optimum M sequence, end the M sequence search mode and return to Step 401.

Figure 9:
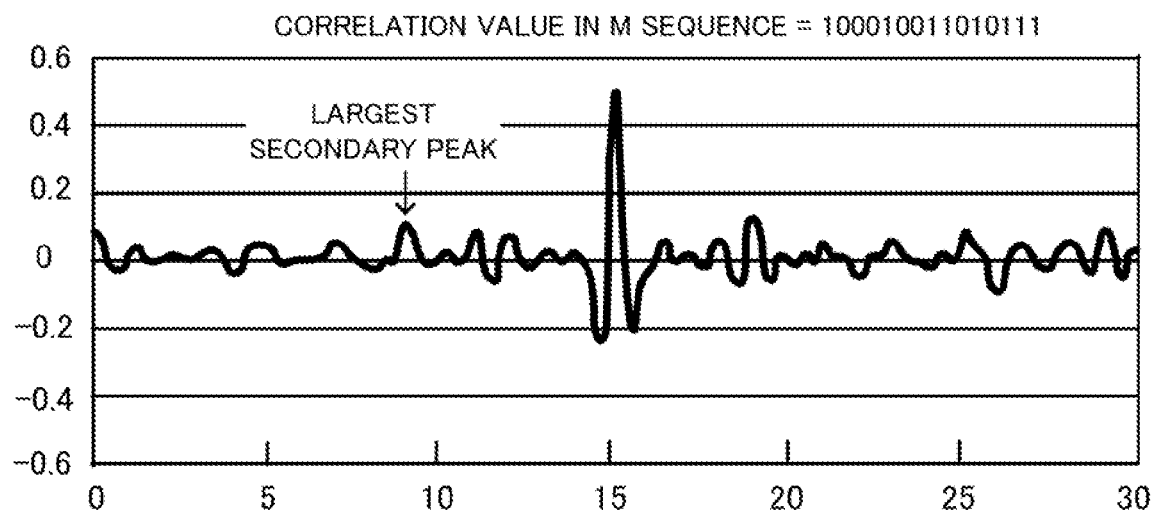
FIG. 9 shows a correlation value waveform in a case where an M sequence in an M sequence search mode is "10010011010111"

FIG. 9 shows a correlation value between the above-described ultrasonic waveform and the 15-bit M sequence model waveform shown in FIG. 2, which indicates that the largest secondary peak is detected in the vicinity of the sampling time point "10" at Step 410.

Figure 10:
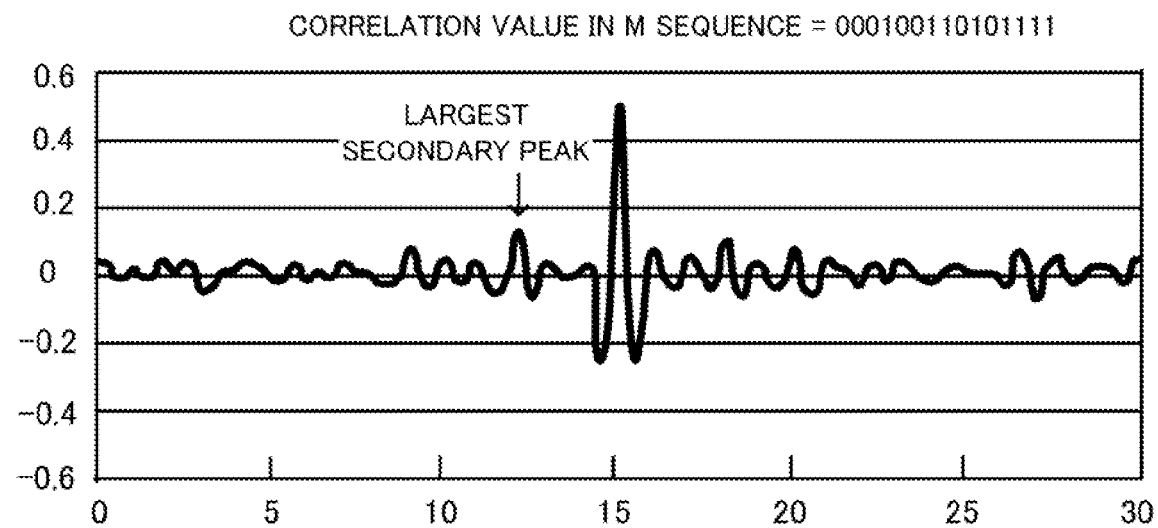
FIG. 10 shows a correlation value waveform in a case where an M sequence in the M sequence search mode is "00100110101111"

Although as the preferred exemplary embodiment of the present invention, the control circuit 101 on the transmission side selects an initial condition after determining a characteristic polynomial of an M sequence in advance, an M sequence may be determined by shifting a bit array of an M sequence one bit by one bit without changing it. FIG. 10 shows a correlation value obtained in a case where ultrasonic is used whose phase is modulated by a data string of a 15-bit M sequence obtained by shifting the 15-bit M sequence shown in FIG. 2 one bit by one bit, that is, "000100110101111" and indicates that the largest secondary peak is detected in the vicinity of the sampling time point "12". In both of FIG. 9 and FIG. 10, a time point where a trigger pulse is received is set to be 0 and a sampling interval is set to be one-eighth a basic wave cycle of the ultrasonic. As long as the transmission device 2 and the reception device 3 are maintained to be apart from each other by a fixed distance, the correlation value peak (primary peak) at an ultrasonic arrival time point appears at the same sampling time point "15". In comparison between the largest secondary peaks in FIG. 9 and FIG. 10, since the largest secondary peak in FIG. 9 is smaller, the M sequence "100010011010111" is determined as an optimum M sequence. In addition, although only an initial condition is changed with a characteristic polynomial determined in advance in the foregoing description, both the characteristic polynomial and the initial condition may be changed.

Moreover, as the preferred exemplary embodiment of the present invention, a plurality of different codes (or indexes) are assigned corresponding to a plurality of different M sequences and a mapping table in which these codes and the corresponding M sequence initial conditions and characteristic polynomials are correlated with each other is disposed on the reception side 3. In the M sequence search mode, when transmitting one M sequence, the transmission side 2 transmits a code (index) assigned to the M sequence by an infrared signal and the reception side 3 refers to the mapping table to read the M sequence initial condition and the characteristic polynomial correlated with the received code. This method enables propagation of an M sequence initial condition and a characteristic polynomial to the reception side by a smaller amount of information.

Thus determined optimum M sequence initial condition is set at the control circuit 101 of the transmission device 2 and used in the ultrasonic propagation time measuring mode. Accordingly, the transmission device 2 generates an infrared signal and an ultrasonic signal based on the set optimum M sequence and sends the same to the reception device 3.

In the ultrasonic propagation time measuring mode, the infrared signal and the ultrasonic signal generated based on the optimum M sequence are sent out from the transmission device 2, so that the data processing circuit 206 reads the trigger detection signal from the memory 205 at Step 401 and sets the M sequence initial condition as the initial condition of the optimum M sequence stored in the memory at Step 402 to generate an optimum M sequence model waveform (Step 403). Since it is not in the M sequence search mode, the data processing circuit 206 jumps over Step 404 to proceed to Step 405, reads the M sequence ultrasonic data of one sample from the memory 205 as described above, executes calculation of correlation with the optimum model waveform generated at Step 403, calculates a correlation value C(t) based on the Expression (1) and stores the same in the memory 205. Until a predetermined time elapses, the data processing circuit 206 executes Step 405 to proceed from Step 406 to Step 408. Since the M sequence search mode ends, Step 408 is skipped to execute Step 414.

At Step 414, the data processing circuit 206 selects a correlation value not less than a predetermined value which is larger than a value of a secondary peak from among all the correlation values calculated within a predetermined time period and detects a top peak from among them.

Figure 11:
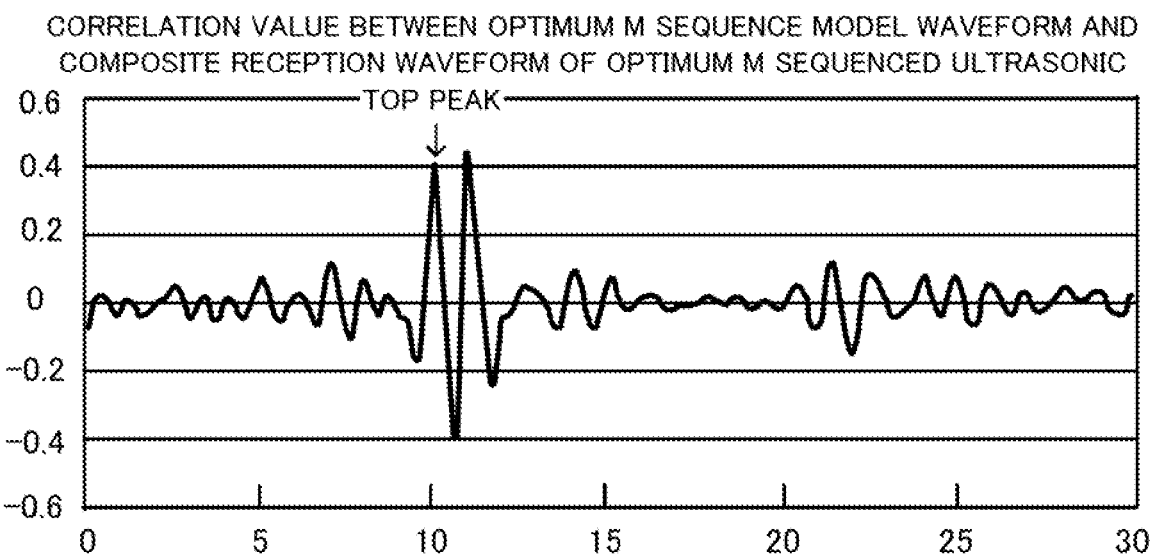
FIG. 11 shows a waveform of a correlation value between an optimum M sequence model waveform and an ultrasonic waveform whose phase is modulated by an optimum M sequence in an ultrasonic propagation time measuring mode.

FIG. 11 is a diagram showing correlation values plotted which are obtained by executing correlation between an optimum M sequence model waveform and a composite wave of ultrasonic whose phase is modulated by an optimum M sequence. The top peak is a peak of a direct wave and the subsequent peak is a peak of a reflected wave. In this example, although the peak of the reflected wave is the largest, if the top peak is not less than a fixed rate of the largest peak value, recognizing the peak as a peak of the direct peak enables reliable detection of an arrival time of the direct wave without being affected by the reflected wave.

Set a sampling time ($t_f$) at a time point where a top peak is detected as a top peak detection time point (Step 415) and calculate an ultrasonic propagation time ($t_f \times \varDelta$ T) (Step 416). Next, erase all the data from the memory 205 at Step 417.

A distance between the transmission device 2 and the reception device 3 is calculated from an ultrasonic propagation time and a sound velocity. In addition, it is possible to specify a position of the transmission device by the principle of trigonometrical survey by obtaining a distance from each of a plurality of the reception devices 3 provided.

In a case where the transmission side is a movable body such as an electronic pen, the transmission device 2 subsequently transmits an infrared signal and an ultrasonic signal generated based on an optimum M sequence in repetition. Therefore, the data processing circuit 206 returns from Step 417 to Step 401 to receive a signal to follow.

Figure 12:
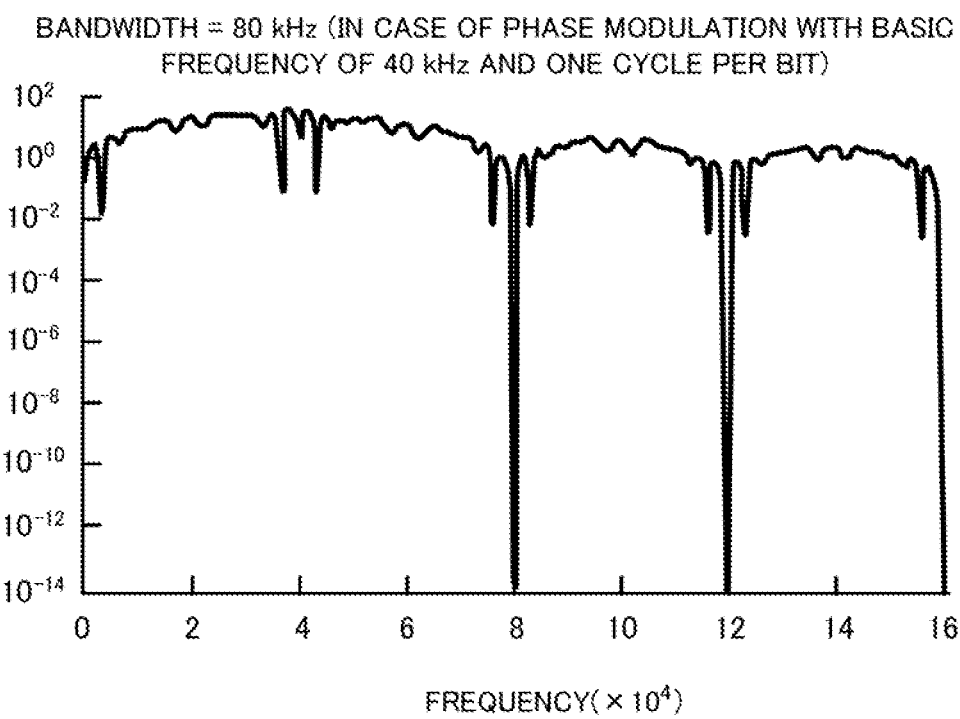
FIG. 12 is a diagram showing a bandwidth of ultrasonic having a basic frequency of 40 kHz whose phase is modulated in one cycle per bit.
Figure 13:
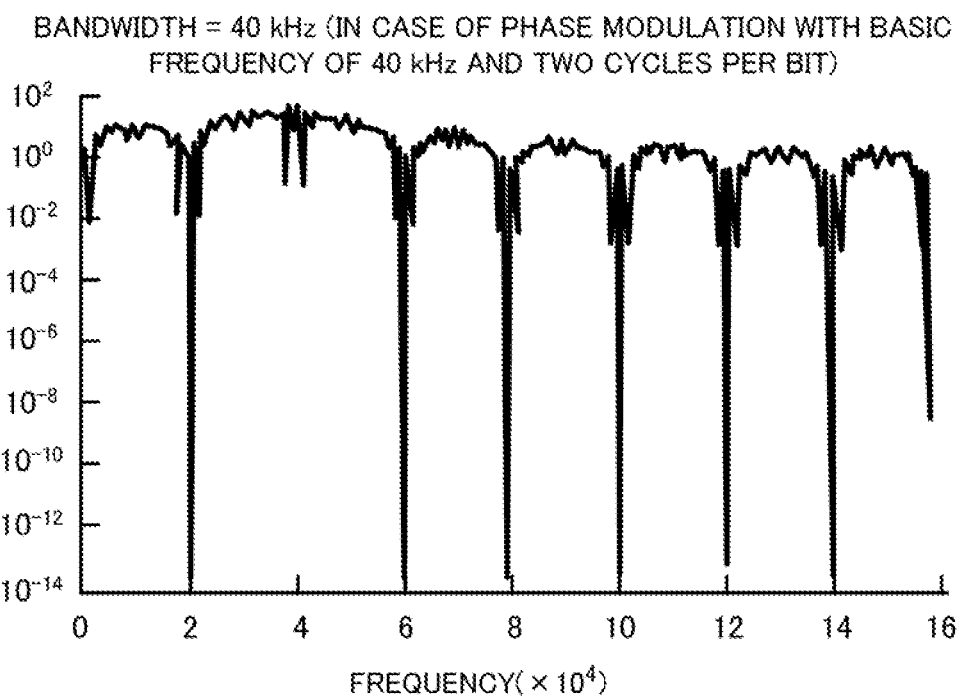
FIG. 13 is a diagram showing a bandwidth of ultrasonic having a basic frequency of 40 kHz whose phase is modulated in two cycles per bit.

Although in the foregoing description, phase modulation is used with one cycle of a basic wave of transmission ultrasonic corresponding to one bit of M sequence data, phase modulation can be also used with two cycles, three cycles, in general, n cycles, of the basic wave corresponding to one bit. Assuming that a main bandwidth necessary for transmission/reception of a phase modulated wave with one cycle of a basic wave corresponding to one bit of M sequence data is 1, when n cycles correspond to one bit, a bandwidth will be 1/n. Assuming that a basic wave frequency is 40 kHz, a main necessary bandwidth will be sequentially narrower centered around 40 kHz, 80 kHz in a case of phase modulation in one cycle per bit, 40 kHz in a case of phase modulation in two cycles per bit and 80/3=26.7 kHz in a case of phase modulation in three cycles per bit, respectively, as shown in FIG. 12, FIG. 13 and FIG. 14.

FIG. 15 shows a received ultrasonic waveform whose phase is modulated with two cycles of a basic wave corresponding to one bit of the 15-bit M sequence data "100010011010111" and a correlation value waveform. In a case of two cycles, since waveforms of the same phase continue in two cycles per bit, peaks P1 and P2 respectively appear one cycle before and one cycle after a correlation peak which appears at an ultrasonic arrival point. When a received wave is an ideal sine wave, the size of the peaks P1 and the P2 will be ½ the size of the largest correlation peak at the ultrasonic arrival point.

FIG. 16 shows a received ultrasonic waveform and a correlation value waveform in a case of phase modulation by the same data with three cycles of a basic wave corresponding to one bit. Similarly in a case of three cycles, since waveforms of the same phase continue in three cycles per bit, peaks P1 and P2 appear one cycle before and one cycle after a correlation peak, respectively, which appears at an ultrasonic arrival point and further peaks P3 and P4 appear two cycles before and two cycles after, respectively. When a received wave is an ideal sine wave, the size of the peaks P1 and the P2 will be ⅔ the size of the largest correlation peak appearing at the ultrasonic arrival point and the size of the peaks P3 and the P4 will be ⅓ the size of the largest correlation peak. In general, in a case of n cycles, a peak appears from n cycles before until n cycles after the correlation peak appearing at the ultrasonic arrival point and its size will be (n−1)/n, (n−2)/n, 1/n, sequentially from one cycle before and after until (n−1) cycles before and after.

When executing phase modulation with n cycles of a basic wave corresponding to one bit of the M sequence data taking the above-described peak into consideration at the time of detecting a largest value of a secondary peak at Step 410 in FIG. 8, it is preferable to designate a time not later than (n−1) cycles before the largest correlation peak.

Under an environment where barely attenuating reflected wave is received immediately after the direct wave, a secondary peak might overlap with a peak appearing not later than (n−1) cycles before the largest correlation peak at the ultrasonic arrival point to make it difficult to detect the secondary peak, so that a secondary peak in the vicinity of the correlation peak appearing not later than (n−1) cycles before should be desirably small.

In a case of phase modulation with three cycles of the basic wave corresponding to one bit, the processing of the secondary peak detection Step 410 is executed by detecting largest values of secondary peaks in a period from 24 cycles before until three cycles before the largest correlation value peak time point from each received wave and determining an M sequence which takes the smallest value among these secondary peak largest values. As shown in FIG. 16, determine an M sequence whose bit string is "110101111000100" to be an M sequence. Shown in FIG. 17 is that a reflected wave is received three cycles after the direct wave arrival point to result in that in a section where the same phase of a wave overlaps, the amplitude will be double and in a section where an inverse phase overlaps, the amplitude will be zero.

In the above-described first exemplary embodiment, when the reception side 3 determines an optimum M sequence, the transmission side 2 propagates an initial condition of the optimum M sequence determined on the reception side by using an infrared signal to the reception side in the propagation time measuring mode.

In the second exemplary embodiment of the present invention, when determining an optimum M sequence, the reception side 3 sets the same at the data processing circuit 206, and the transmission side 2 makes only a trigger signal be included in an infrared signal without including the optimum M sequence determined on the reception side in the propagation time measuring mode. This enables reduction in the amount of information in the propagation time measuring mode.

Figure 19:
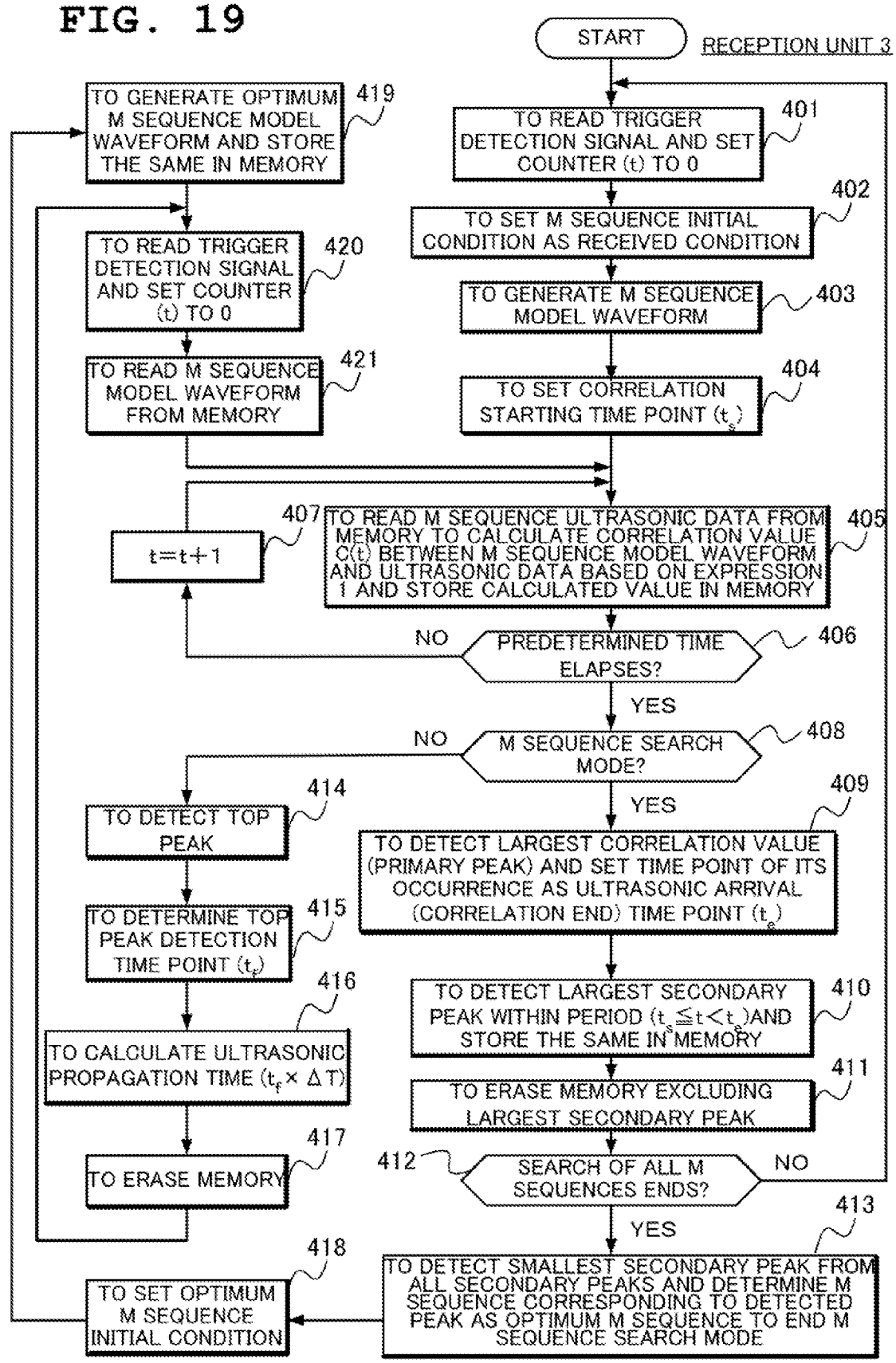
FIG. 19 is a flow chart showing operation of a reception device according to the second exemplary embodiment of the present invention.

FIG. 18 and FIG. 19 show flow charts of the transmission device 2 and the reception device 3 according to the second exemplary embodiment, respectively. In these figures, steps having the same functions as those in FIG. 7 and FIG. 8 are given the same reference numerals and steps indicated by bald frames represent steps added.

In FIG. 18, after setting an initial condition of an M sequence determined by the reception side at Step 308, the control circuit 101 proceeds to Step 309, generates optimum M sequence data and generates an ultrasonic driving signal based on the data (Step 310). Next, generate an infrared driving signal only including a trigger signal at Step 311 and drive, at Step 312, the ultrasonic transmitter and the infrared transmitter by the driving signals generated at Steps 310 and 311, respectively, to return to the pen operation check Step 307.

In FIG. 19, when detecting a smallest secondary peak from among all the largest secondary peaks to determine an M sequence corresponding to the same as an optimum M sequence at Step 413, the data processing circuit 206 proceeds to Step 418 to set an initial condition of the optimum M sequence, and generates an optimum M sequence model waveform and stores the same in the memory 205 at Step 419.

When monitoring the memory 205 at Step 420 to find that a trigger detection signal is written, the data processing circuit 206 reads the same and sets the sampling counter to 0, reads the optimum M sequence model waveform from the memory 205 to proceed to the correlation processing Step 405. When executing the correlation processing for a predetermined time period (Step 404), the data processing circuit 206 proceeds to Step 414 via Step 408 to detect a top peak and executes Steps 415 and 416 to calculate an ultrasonic propagation time. After erasing the memory 205, the data processing circuit 206 returns to Step 420 from Step 417 and when the subsequent data is written in the memory 205, reads the same and again executes the correlation processing.

The foregoing description is not limited to use of one electronic pen but can be applied to use of a plurality of electronic pens. In this case, different M sequences are applied to each electronic pen of the plurality of the electronic pens 1. In the M sequence search mode, a value that an initial condition of an M sequence can assume is set in advance on an electronic pen basis so as not to overlap with each other to execute the M sequence search mode by each electronic pen.

Assuming, for example, a case where three electronic pens are used, divide 15 data strings by five into three groups and assign each group to each of the three electronic pens, and each electronic pen is designed to obtain only an initial condition for taking a data string of an assigned group to determine an optimum M sequence. Alternatively, data strings may be sequentially adopted starting at one whose secondary peak calculated for each initial condition of an M sequence in the M sequence search mode is the smallest.

In a case, for example, of assignment to five pens, among 15 data strings, five data strings are sequentially assigned to each electronic pen starting with a data string with whose secondary peak is the smallest. An infrared signal transmitted from the infrared transmitter 106 is assumed to be a signal distinguishable by each electronic pen. In the reception device 2, the infrared receiver 203 receives the infrared signal, and when detecting a trigger pulse corresponding to each electronic pen from an output of the infrared receiver 203, the detection circuit 204 stores a trigger pulse arrival time in the memory 205. When executing the correlation processing of an ultrasonic reception waveform with a generated M sequence model waveform, the data processing circuit 206 is allowed to detect an ultrasonic arrival time of the relevant electronic pen as a peak of a correlation value of the M sequence.

While the foregoing description has been made of an electronic pen as an example, the present invention is also applicable to such a movable body as a robot. More specifically, with the transmission device 2 and the reception device 3 attached to a robot, sending ultrasonic from the transmission device to the surroundings, detecting a reflected wave from a target body at the reception device, measuring a reciprocating propagation time of the reflected wave and calculating a distance to the target body from the propagation time prevents the robot from colliding with surrounding bodies. In such a case, since the reception device is allowed to directly know timing at which the transmission device sends out ultrasonic, it is unnecessary to send a trigger pulse into the space.

In addition, while the foregoing description has been made of modulation by an M sequence, the modulation is not limited to an M sequence as long as it is a pseudo random signal having high self-correlativity and low cross-correlation with other sequence such as a Gold sequence.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optimum pseudo random sequence determining method of a reception device for detecting a position of a transmission device by receiving an ultrasonic signal transmitted from said transmission device, comprising the steps:

a) sending, from said transmission device, an ultrasonic signal modulated by data of a pseudo random sequence generated based on data which defines a pseudo random sequence having high self-correlativity;

b) receiving the ultrasonic signal at said reception device, generating an ultrasonic model waveform of a pseudo random sequence of said ultrasonic signal and executing processing of correlation between the ultrasonic model waveform and the received ultrasonic signal to detect a correlation waveform; and c) at said reception device, with respect to data of different pseudo random sequences, repeatedly executing said Steps (a) and (b), detecting said correlation waveform in plural, detecting a smallest secondary peak among secondary peaks appearing in each correlation waveform when said ultrasonic model waveform and the received ultrasonic signal coincide in part and determining data of a pseudo random sequence corresponding to the smallest secondary peak as data of an optimum pseudo random sequence for assigning to said transmission device.

2. The optimum pseudo random sequence determining method according to claim 1, wherein at said Step (b), a largest secondary peak appearing in each said correlation waveform is detected and at said Step (c), a peak with a smallest value among a plurality of largest secondary peaks appearing in all the correlation waveforms is detected as said smallest secondary peak.

3. A position detection system including at least one transmission device and a reception device for detecting a position of said transmission device, wherein said transmission device transmits a first ultrasonic signal modulated by data of a pseudo random sequence having high self-correlativity, said reception device generates an ultrasonic model waveform of a pseudo random sequence of said first ultrasonic signal received, obtains a correlation value between a waveform of said first ultrasonic signal received and said ultrasonic model waveform generated, determines data which defines an optimum pseudo random sequence with which a secondary peak of said correlation value becomes the smallest and assigns the data to said transmission device, said transmission device simultaneously sends a trigger signal indicative of transmission timing and a second ultrasonic signal modulated by data of a pseudo random sequence generated based on data which defines an optimum pseudo random sequence assigned by said reception device, and said reception device executes correlation processing between a waveform of a second ultrasonic signal received and an ultrasonic model waveform of a pseudo random sequence of said second ultrasonic signal to specify an arrival time of said ultrasonic signal and calculates a propagation time of the ultrasonic from an arrival time point of said trigger signal and the specified arrival time to detect a position of said transmission device based on said ultrasonic propagation time calculated.

4. The position detection system according to claim 3, wherein said reception device determines data which defines a plurality of pseudo random sequences, starting with a sequence with which a secondary peak of said correlation value is the smallest, and assigns the data which defines the plurality of pseudo random sequences to the plurality of said transmission devices.

5. The position detection system according to claim 3, wherein said reception device determines a characteristic polynomial in addition to data which defines said pseudo random sequence, and said transmission device generates an ultrasonic signal modulated by data of said pseudo random sequence by using the data which defines said pseudo random sequence and said characteristic polynomial.

6. The position detection system according to claim 3, wherein said transmission device transmits a plurality of first ultrasonic signals modulated by data of a plurality of pseudo random sequences different from each other which have high self-correlativity, said reception device generates an ultrasonic model waveform of a pseudo random sequence of said first ultrasonic signal, executes correlation processing between each ultrasonic model waveform and a waveform of each first ultrasonic signal to detect a secondary peak of a correlation value, determines data of a pseudo random sequence which generates a smallest secondary peak among secondary peaks detected in all the correlation processing as data of an optimum pseudo random sequence and assigns the data to said transmission device, said transmission device simultaneously sends a trigger signal indicative of transmission timing and a second ultrasonic signal modulated by data of an optimum pseudo random sequence assigned by the reception device, and said reception device calculates a correlation value between a waveform of a second ultrasonic signal received and an ultrasonic model waveform of a pseudo random sequence of said second ultrasonic signal, detects a primary peak of the calculated correlation value and calculates an ultrasonic propagation time from a time point of reception of said trigger signal and a time point of detection of the primary peak to detect a position of said transmission device based on said ultrasonic propagation time calculated.

7. The position detection system according to claim 6, wherein said reception device generates an ultrasonic model waveform of a pseudo random sequence of the plurality of the first ultrasonic signals, executes correlation processing between each ultrasonic model waveform and a waveform of each first ultrasonic signal to detect a secondary peak of a correlation value, determines data of a plurality of pseudo random sequences, starting with a sequence with which a secondary peak detected in all the correlation processing is the smallest, and assigns the data of the plurality of pseudo random sequences to each said transmission device different from each other.

8. The position detection system according to claim 6, wherein said reception device detects a largest secondary peak of each said correlation value to detect a peak with a smallest value among a plurality of largest secondary peaks of all the correlation values as said smallest secondary peak.

9. The position detection system according to claim 6, wherein said transmission device simultaneously sends said trigger signal including data which defines a pseudo random sequence and an ultrasonic signal modulated by data of a pseudo random sequence generated based on the data which defines the pseudo random sequence, and said reception device generates an ultrasonic model waveform of an ultrasonic signal modulated by data of a pseudo random sequence generated based on data which defines a pseudo random sequence that is included in a received trigger signal, detects a plurality of correlation values between the ultrasonic model waveform and the received ultrasonic signal, detects a largest secondary peak appearing in the vicinity of a primary peak from the plurality of correlation values and obtains said secondary peak in plural with respect to data of different pseudo random sequences to determine data of a pseudo random sequence corresponding to a smallest secondary peak among the plurality of secondary peaks as data of said optimum pseudo random sequence.

10. The position detection system according to claim 6, wherein said transmission device sends said trigger signal including data which defines a pseudo random sequence differing in each transmission cycle and data indicative of a characteristic polynomial differing in each transmission cycle, and said reception device generates said ultrasonic model waveform based on the data which defines a pseudo random sequence and the characteristic polynomial data that are included in said trigger signal received.

11. The position detection system according to claim 6, wherein with n cycles of an ultrasonic signal assigned to one bit of data of said pseudo random sequence, said transmission device modulates a phase of the ultrasonic and with n cycles of an ultrasonic signal assigned to one bit of the data of said pseudo random sequence, said reception device modulates a phase of the ultrasonic signal to generate said ultrasonic signal model waveform, thereby detecting a largest secondary peak from among peaks appearing not later than (n−1) cycles before a primary peak of said correlation value.

12. A position detection method, wherein
at at least one transmission device, transmitting a first ultrasonic signal modulated by data of a pseudo random sequence having high self-correlativity,
at a reception device for detecting a position of said transmission device, generating an ultrasonic model waveform of a pseudo random sequence of said first ultrasonic signal received, obtaining a correlation value between a waveform of said first ultrasonic signal received and said ultrasonic model waveform generated, determining data which defines an optimum pseudo random sequence with which a secondary peak of said correlation value becomes the smallest and assigning the data to said transmission device,
at said transmission device, simultaneously sending a trigger signal indicative of transmission timing and a second ultrasonic signal modulated by data of a pseudo random sequence generated based on data which defines an optimum pseudo random sequence assigned by said reception device, and
at said reception device, executing correlation processing between a waveform of a second ultrasonic signal received and an ultrasonic model waveform of a pseudo random sequence of said second ultrasonic signal to specify an arrival time of said ultrasonic signal, calculating a propagation time of the ultrasonic from an arrival time point of said trigger signal and the specified arrival time and detecting a position of said transmission device based on said ultrasonic propagation time calculated.

13. The position detection method according to claim 12, wherein
at said reception device for detecting a position of said transmission device, determining data which defines a plurality of pseudo random sequences, starting with a sequence with which a secondary peak of said correlation value is the smallest, and assigning the data which defines the plurality of pseudo random sequences to the plurality of said transmission devices.

14. The position detection method according to claim 12, wherein
at said reception device, determining a characteristic polynomial in addition to data which defines said pseudo random sequence, and
at said transmission device, generating an ultrasonic signal modulated by data of said pseudo random sequence by using the data which defines said pseudo random sequence and said characteristic polynomial.

15. The position detection method according to claim 12, wherein
at said transmission device, sending out a plurality of first ultrasonic signals modulated by data of a plurality of pseudo random sequences different from each other which have high self-correlativity,
at said reception device for detecting a position of said transmission device, generating an ultrasonic model waveform of a pseudo random sequence of said first ultrasonic signal, executing correlation processing between each ultrasonic model waveform and a waveform of each first ultrasonic signal to detect a secondary peak of a correlation value, determining data of a pseudo random sequence which generates a smallest secondary peak among secondary peaks detected in all the correlation processing as data of an optimum pseudo random sequence and assigning the data to said transmission device,
at, said transmission device, simultaneously sending a trigger signal indicative of transmission timing and a second ultrasonic signal modulated by data of an optimum pseudo random sequence assigned by the reception device, and
at said reception device, calculating a correlation value between a waveform of a second ultrasonic signal received and an ultrasonic model waveform of a pseudo random sequence of said second ultrasonic signal, detecting a primary peak of the calculated correlation value, calculating an ultrasonic propagation time from a time point of reception of said trigger signal and a time point of detection of the primary peak to detect a position of said transmission device based on said ultrasonic propagation time calculated.

16. The position detection method according to claim 15, wherein
at said reception device for detecting a position of said transmission device, generating an ultrasonic model waveform of a pseudo random sequence of the plurality of the first ultrasonic signals, executing correlation processing between each ultrasonic model waveform and a waveform of each first ultrasonic signal to detect a secondary peak of a correlation value, determining data of a plurality of pseudo random sequences, starting with a sequence with which a secondary peak detected in all the correlation processing is the smallest, and assigning the data of the plurality of pseudo random sequences to each said transmission device different from each other.

17. The position detection method according to claim 15, wherein at said reception device, detecting a largest secondary peak of each said correlation value to detect a peak with a smallest value among a plurality of largest secondary peaks of all the correlation values as said smallest secondary peak.

18. The position detection method according to claim 15, wherein
at said transmission device, simultaneously sending said trigger signal including data which defines a pseudo random sequence and an ultrasonic signal modulated by data of a pseudo random sequence generated based on the data which defines the pseudo random sequence, and
at said reception device, generating an ultrasonic model waveform of an ultrasonic signal modulated by data of a pseudo random sequence generated based on data which defines a pseudo random sequence that is included in a received trigger signal, detecting a plurality of correlation values between the ultrasonic model waveform and the received ultrasonic signal, detecting a largest secondary peak appearing in the vicinity of a primary peak from the plurality of correlation values and obtaining said secondary peak in plural with respect to data of different pseudo random sequences to determine data of a pseudo random sequence corresponding to a smallest secondary peak among the plurality of secondary peaks as data of said optimum pseudo random sequence.

19. The position detection method according to claim 15, wherein at said transmission device, sending said trigger signal including data which defines a pseudo random sequence differing in each transmission cycle and data indicative of a characteristic polynomial differing in each transmission cycle, and at said reception device, generating said ultrasonic model waveform based on the data which defines a pseudo random sequence and the characteristic polynomial data that are included in said trigger signal received.

20. The position detection method according to claim 15, wherein with n cycles of an ultrasonic signal assigned to one bit of data of said pseudo random sequence, at said transmission device, modulating a phase of the ultrasonic and with n cycles of an ultrasonic signal assigned to one bit of the data of said pseudo random sequence, at said reception device, modulating a phase of the ultrasonic signal to generate said ultrasonic signal model waveform, thereby detecting a largest secondary peak from among peaks appearing not later than (n−1) cycles before a primary peak of said correlation value.

* * * * *